United States Patent
Liu

(10) Patent No.: US 10,237,049 B2
(45) Date of Patent: Mar. 19, 2019

(54) FULL-DUPLEX COMMUNICATION METHOD IN WLAN SYSTEM AND APPARATUS

(71) Applicant: Huawei Technologies Co., Ltd., Shenzhen, Guangdong (CN)

(72) Inventor: Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 50 days.

(21) Appl. No.: 15/462,129

(22) Filed: Mar. 17, 2017

(65) Prior Publication Data

US 2017/0195107 A1 Jul. 6, 2017

Related U.S. Application Data

(63) Continuation of application No. PCT/CN2014/086959, filed on Sep. 19, 2014.

(51) Int. Cl.
*H04L 5/14* (2006.01)
*H04B 7/0452* (2017.01)
(Continued)

(52) U.S. Cl.
CPC ............ *H04L 5/14* (2013.01); *H04B 7/0452* (2013.01); *H04L 5/0055* (2013.01);
(Continued)

(58) Field of Classification Search
CPC ........ H04L 5/14; H04L 5/0023; H04L 5/1423
See application file for complete search history.

(56) References Cited

U.S. PATENT DOCUMENTS 8,023,438 B2 9/2011 Kangasmaa et al.
2007/0230423 A1* 10/2007 Yoshida ............... H04W 76/10
370/338

(Continued)

FOREIGN PATENT DOCUMENTS

CN 102111177 A 6/2011
CN 102571675 A 7/2012
(Continued)

OTHER PUBLICATIONS

Duarte, Melissa, et al., "Design and Characterization of a Full-Duplex Multiantenna System for WiFi Networks," IEEE Transactions on Vehicular Technology, vol. 63, No. 3, Mar. 2014, 18 pages.

(Continued)

*Primary Examiner* — Raj Jain

(57) ABSTRACT

A method includes: obtaining, by an access point (AP), use permission of a channel; determining, by the AP after obtaining the use permission of the channel, scheduling information for a station (STA) participating in full-duplex transmission, where the scheduling information includes information about a first station that performs uplink transmission on the channel and information about a second station that performs downlink transmission on the channel at the same time, or the scheduling information includes information about a third station that simultaneously performs uplink and downlink transmission on the channel; and sending, by the AP, a trigger frame, where the trigger frame includes the scheduling information.

11 Claims, 12 Drawing Sheets

(51) Int. Cl.
*H04L 5/00* (2006.01)
*H04L 27/26* (2006.01)
*H04W 24/08* (2009.01)
*H04W 72/12* (2009.01)
*H04W 74/08* (2009.01)
*H04W 84/12* (2009.01)

(52) U.S. Cl.
CPC ......... *H04L 27/2601* (2013.01); *H04W 24/08* (2013.01); *H04W 72/1268* (2013.01); *H04W 72/1273* (2013.01); *H04W 72/1289* (2013.01); *H04W 74/0816* (2013.01); *H04W 84/12* (2013.01)

(56) References Cited

U.S. PATENT DOCUMENTS

| | | |
|---|---|---|
| 2010/0232324 A1 | 9/2010 | Radunovic et al. |
| 2014/0022965 A1* | 1/2014 | Sarca ........................ H04B 1/40 370/280 |
| 2014/0071865 A1 | 3/2014 | Aggarwal et al. |
| 2014/0126509 A1 | 5/2014 | You |
| 2015/0229461 A1* | 8/2015 | DiFazio .................... H04L 5/14 370/280 |
| 2017/0195107 A1* | 7/2017 | Liu ........................... H04L 5/14 |

FOREIGN PATENT DOCUMENTS

| | | |
|---|---|---|
| EP | 2095516 A2 | 9/2009 |
| WO | 2013168105 A1 | 11/2013 |

OTHER PUBLICATIONS

IEEE Standards Association, "Part 11: Wireless LAN Medium Access Control (MAC) and Physical Layer (PHY) Specifications," IEEE Computer Society, IEEE Std 802.11-2012 (Revision of IEEE Std 802.11-2012) New York, NY, Mar. 29, 2012, 2793 pages.

IEEE Standards Association, "Part 11: Wireless LAN Medium Access Control (MAC) and Physical Layer (PHY) Specifications, Amendment 4: Enhancements for Very High Throughput for Operation in Bands below 6 GHz," IEEE Computer Society, IEEE Std 802.11ac-2013 (Amendment to IEEE Std 802.11-2012, as amended by IEEE Std 802.11ae-2012, IEEE Std 802.11aa-2012, and IEEE Std 802.11ad-2012) New York, NY, 425 pages.

* cited by examiner

FULL-DUPLEX COMMUNICATION METHOD IN WLAN SYSTEM AND APPARATUS

CROSS-REFERENCE TO RELATED APPLICATIONS

This application is a continuation of International Application No. PCT/CN2014/086959, filed on Sep. 19, 2014, the disclosure of which is hereby incorporated by reference in its entirety.

TECHNICAL FIELD

The present invention relates to the field of wireless communications technologies, and in particular, to a full-duplex communication method in a WLAN system and an apparatus.

BACKGROUND

A conventional wireless local area network (WLAN for short) standard that is based on an orthogonal frequency division multiplexing (OFDM for short) technology includes gradually evolved versions such as 802.11a, 802.11n, and 802.11ac. A conventional WLAN system is still a half-duplex system in terms of wireless transmission. That is, any communications node including an access point (AP for short) and a station (Station, STA for short) cannot simultaneously send and receive data at any moment.

Currently, the IEEE 802.11 standardization organization has started to standardize a standard 802.11ax of a new-generation WLAN that is referred to as a high efficiency wireless local area network (High Efficiency WLAN, HEW for short). As a candidate technology, a full-duplex technology is used with uplink multi-user multiple input multiple output (Multi-user MIMO, MU-MIMO for short) and orthogonal frequency division multiple access (OFDMA for short) to reduce random contention and improve spectral efficiency of the WLAN system by means of multi-user transmission. The full-duplex technology allows a user in an uplink transmission direction and a user in a downlink transmission direction to simultaneously perform transmission on a same radio channel. In order to cancel self-interference from a transmitted signal to a received signal within a communications node, a self-interference cancellation operation needs to be performed on a receiver unit such as an antenna, an intermediate radio frequency, or a baseband. Therefore, the communications node needs to perform channel self-interference detection before performing communication.

Currently, there is no effective full-duplex communications solution in the WLAN system.

SUMMARY

Embodiments of the present invention provide a full-duplex communication method in a WLAN system and an apparatus, so as to resolve a full-duplex communication problem in the WLAN system.

According to a first aspect, a communications apparatus is provided, and the apparatus is disposed on an access point AP apparatus in a wireless local area network and includes:

a channel contention unit, configured to obtain use permission of a channel;

a scheduling information determining unit, configured to: after the use permission of the channel is obtained, determine scheduling information for a station participating in full-duplex transmission, where the scheduling information includes information about a first station that performs uplink transmission on the channel and information about a second station that performs downlink transmission on the channel at the same time, or the scheduling information includes information about a third station that simultaneously performs uplink and downlink transmission on the channel; and a transmission unit, configured to send the scheduling information.

With reference to the first aspect, in a first possible implementation manner of the first aspect, the transmission unit is further configured to:

after sending of a trigger frame that carries the scheduling information is completed, send a downlink data frame to the second station or the third station after waiting for SIFS, where the downlink data frame includes a legacy preamble, and the legacy preamble in the downlink data frame sent to the second station and a legacy preamble in an uplink data frame sent by the first station are simultaneously sent on the channel and have same content; or the legacy preamble in the downlink data frame sent to the third station and a legacy preamble in an uplink data frame sent by the third station are simultaneously sent on the channel and have same content.

With reference to the first possible implementation manner of the first aspect, in a second possible implementation manner of the first aspect, the legacy preamble includes a rate field and a length field, and a value of the rate field and a value of the length field meet: receive duration RXTIME that is calculated according to the value of the rate field and the value of the length field is not less than duration of full-duplex transmission including an acknowledgement frame.

With reference to any one of the first aspect, or the first to the second possible implementation manners of the first aspect, in a third possible implementation manner of the first aspect, the scheduling information further includes transmission duration or an upper limit of transmission duration of the uplink data frame sent by the first station or the third station, or transmission duration or an upper limit of transmission duration of the downlink data frame sent to the second station or the third station.

With reference to the third possible implementation manner of the first aspect, in a fourth possible implementation manner of the first aspect, if the transmission duration of the uplink data frame sent by the first station or the third station is greater than the transmission duration of the downlink data frame sent by the access point AP, and an absolute value of a difference between the two is greater than the short interframe space SIFS, the scheduling information further includes an interrupt location and interrupt duration in an uplink data frame transmission process of the first station or the third station; and the transmission unit is further configured to:

stop, at the interrupt location in the uplink data frame transmission process of the first station or the third station, receiving the uplink data frame sent by the first station or the third station, and start receiving an acknowledgement frame sent by the second station or the third station; and after the interrupt duration elapses, resume receiving the uplink data frame sent by the first station or the third station.

With reference to the third possible implementation manner of the first aspect, in a fifth possible implementation manner of the first aspect, if the transmission duration of the downlink data frame sent by the AP to the second station or the third station is greater than the transmission duration of the uplink data frame sent by the first station or the third station, and an absolute value of a difference between the two is greater than the SIFS, the scheduling information further includes:

an interrupt location and interrupt duration in a downlink data frame transmission process of the AP; and the transmission unit is further configured to:

stop, at the interrupt location in transmitting the downlink data frame of the AP, transmitting the downlink data frame, and start sending an acknowledgement frame to the first station or the third station; and after the interrupt duration elapses, resume sending the downlink data frame.

With reference to any one of the first aspect, or the first to the fifth possible implementation manners of the first aspect, in a sixth possible implementation manner of the first aspect, the communications apparatus further includes a measurement unit, and the measurement unit is configured to perform channel self-interference measurement when the transmission unit sends the trigger frame.

With reference to any one of the first aspect, or the first to the sixth possible implementation manners of the first aspect, in a seventh possible implementation manner of the first aspect, the information about the first station, the information about the second station, or the information about the third station is specifically:

an identifier of a single station, an address of a single station, a group identifier, or a group address.

With reference to any one of the first aspect, or the first to the seventh possible implementation manners of the first aspect, in an eighth possible implementation manner of the first aspect, when a total quantity of the first station and the third station is greater than 2, the scheduling information further includes information about resource allocation in uplink multi-user multiple input multiple output MU-MIMO or information about resource allocation in uplink orthogonal frequency division multiple access OFDMA; or when a total quantity of the second station and the third station is greater than 2, the scheduling information further includes information about resource allocation in downlink multi-user multiple input multiple output MU-MIMO or information about resource allocation in downlink orthogonal frequency division multiple access OFDMA.

According to a second aspect, an access point AP apparatus is provided, including the communications apparatus according to any one of the first aspect, or the first to the eighth possible implementation manners of the first aspect.

According to a third aspect, a communications apparatus is provided, and the apparatus is disposed on a station STA in a wireless local area network and includes:

a receiving unit, configured to receive scheduling information sent by an access point AP;

a scheduling information obtaining unit, configured to obtain the scheduling information by means of parsing, where the scheduling information includes information about a first station that performs uplink transmission on the channel and information about a second station that performs downlink transmission on the channel at the same time, or the scheduling information includes information about a third station that simultaneously performs uplink and downlink transmission on the channel; and a transmission unit, configured to transmit data according to the scheduling information when the station STA on which the communications apparatus is located is the first station, the second station, or the third station.

With reference to the third aspect, in a first possible implementation manner of the third aspect, the transmission unit is specifically configured to:

after receiving of a trigger frame that carries the scheduling information is completed, if the STA on which the communications apparatus is located is the first station, send an uplink data frame after waiting for SIFS, where a legacy preamble in the uplink data frame and a legacy preamble in a downlink data frame sent by the AP to the second station are simultaneously sent and have same content; or after receiving of a trigger frame that carries the scheduling information is completed, if the STA on which the communications apparatus is located is the third station, send an uplink data frame immediately, where a legacy preamble in the uplink data frame is the same as a legacy preamble in a downlink data frame sent by the AP to the third station.

With reference to the first possible implementation manner of the third aspect, in a second possible implementation manner of the third aspect, the legacy preamble includes a rate field and a length field, and a value of the rate field and a value of the length field meet: receive duration RXTIME that is calculated according to the value of the rate field and the value of the length field is not less than duration of full-duplex transmission including an acknowledgement frame.

With reference to any one of the third aspect, or the first to the second possible implementation manners of the third aspect, in a third possible implementation manner of the third aspect, the scheduling information further includes transmission duration or an upper limit of transmission duration of the uplink data frame sent by the first station or the third station, or transmission duration or an upper limit of transmission duration of the downlink data frame sent to the second station or the third station.

With reference to the third possible implementation manner of the third aspect, in a fourth possible implementation manner of the third aspect, if the transmission duration of the uplink data frame sent by the first station or the third station is greater than the transmission duration of the downlink data frame sent by the AP, and an absolute value of a difference between the two is greater than the SIFS, the scheduling information further includes:

an interrupt location and interrupt duration in an uplink data frame transmission process of the first station or the third station; and the transmission unit is further configured to:

when the STA on which the communications apparatus is located is the first station or the third station, stop sending the uplink data frame at the interrupt location in the uplink data frame transmission process, and after the interrupt duration elapses, resume sending the uplink data frame.

With reference to the third possible implementation manner of the third aspect, in a fifth possible implementation manner of the third aspect, if the transmission duration of the downlink data frame sent by the AP is greater than the transmission duration of the uplink data frame sent by the first station or the third station, and an absolute value of a difference between the two is greater than the SIFS, the scheduling information further includes:

an interrupt location and interrupt duration in a downlink data frame transmission process of the AP; and the transmission unit is further configured to:

when the STA on which the communications apparatus is located is the second station or the third station, stop, at the interrupt location in transmitting the downlink data frame sent by the AP, receiving the downlink data frame sent by the AP, and after the interrupt duration elapses, resuming receiving the downlink data frame sent by the AP.

With reference to any one of the third aspect, or the first to the fifth possible implementation manners of the third aspect, in a sixth possible implementation manner of the third aspect, the communications apparatus further includes a measurement unit, and the measurement unit is configured to: after receiving of the trigger frame is completed, perform channel self-interference measurement in transmission duration of the legacy preamble.

According to a fourth aspect, a station STA apparatus is provided, including the communications apparatus according to any one of the third aspect, or the first to the sixth possible implementation manners of the third aspect.

According to a fifth aspect, a full-duplex communication method in a WLAN system is provided, and the method is applied to an access point AP in a wireless local area network and includes:

obtaining, by the access point AP, use permission of a channel;

determining, by the AP after obtaining the use permission of the channel, scheduling information for a station STA participating in full-duplex transmission, where the scheduling information includes information about a first station that performs uplink transmission on the channel and information about a second station that performs downlink transmission on the channel at the same time, or the scheduling information includes information about a third station that simultaneously performs uplink and downlink transmission on the channel; and sending, by the AP, the scheduling information.

With reference to the fifth aspect, in a first possible implementation manner of the fifth aspect, after the AP sends a trigger frame that carries the scheduling information, the method further includes:

after sending of the trigger frame is completed, sending, by the AP, a downlink data frame to the second station or the third station after waiting for SIFS, where the downlink data frame includes a legacy preamble, and the legacy preamble in the downlink data frame sent to the second station and a legacy preamble in an uplink data frame sent by the first station are simultaneously sent on the channel and have same content; or the legacy preamble in the downlink data frame sent to the third station and a legacy preamble in an uplink data frame sent by the third station are simultaneously sent on the channel and have same content.

With reference to the first possible implementation manner of the fifth aspect, in a second possible implementation manner of the fifth aspect, the legacy preamble includes a rate field and a length field, and a value of the rate field and a value of the length field meet: receive duration RXTIME that is calculated according to the value of the rate field and the value of the length field is not less than duration of full-duplex transmission including an acknowledgement frame.

With reference to any one of the fifth aspect, or the first to the second possible implementation manners of the fifth aspect, in a third possible implementation manner of the fifth aspect, the scheduling information further includes transmission duration or an upper limit of transmission duration of the uplink data frame sent by the first station or the third station, or transmission duration or an upper limit of transmission duration of the downlink data frame sent to the second station or the third station.

With reference to the third possible implementation manner of the fifth aspect, in a fourth possible implementation manner of the fifth aspect, if the transmission duration of the uplink data frame sent by the first station or the third station is greater than the transmission duration of the downlink data frame sent by the access point AP, and an absolute value of a difference between the two is greater than the short interframe space SIFS, the scheduling information further includes an interrupt location and interrupt duration in an uplink data frame transmission process of the first station or the third station; and the method further includes:

stopping, at the interrupt location in the uplink data frame transmission process of the first station or the third station, receiving the uplink data frame sent by the first station or the third station, and starting receiving an acknowledgement frame sent by the second station or the third station; and after the interrupt duration elapses, resuming receiving the uplink data frame sent by the first station or the third station.

With reference to the third possible implementation manner of the fifth aspect, in a fifth possible implementation manner of the fifth aspect, if the transmission duration of the downlink data frame sent by the AP to the second station or the third station is greater than the transmission duration of the uplink data frame sent by the first station or the third station, and an absolute value of a difference between the two is greater than the SIFS, the scheduling information further includes:

an interrupt location and interrupt duration in a downlink data frame transmission process of the AP; and the method further includes:

stopping, at the interrupt location in transmitting the downlink data frame of the AP, transmitting the downlink data frame, and starting sending an acknowledgement frame to the first station or the third station; and after the interrupt duration elapses, resuming sending the downlink data frame.

With reference to any one of the fifth aspect, or the first to the fifth possible implementation manners of the fifth aspect, in a sixth possible implementation manner of the fifth aspect, the method further includes:

performing channel self-interference measurement when the trigger frame that carries the scheduling information is being sent.

With reference to any one of the fifth aspect, or the first to the sixth possible implementation manners of the fifth aspect, in a seventh possible implementation manner of the fifth aspect, the information about the first station, the information about the second station, or the information about the third station is specifically:

an identifier of a single station, an address of a single station, a group identifier, or a group address.

With reference to any one of the fifth aspect, or the first to the seventh possible implementation manners of the fifth aspect, in an eighth possible implementation manner of the fifth aspect, when a total quantity of the first station and the third station is greater than 2, the scheduling information further includes information about resource allocation in uplink multi-user multiple input multiple output MU-MIMO or information about resource allocation in uplink orthogonal frequency division multiple access OFDMA; or when a total quantity of the second station and the third station is greater than 2, the scheduling information further includes information about resource allocation in downlink multi-user multiple input multiple output MU-MIMO or information about resource allocation in downlink orthogonal frequency division multiple access OFDMA.

According to a sixth aspect, a full-duplex communication method in a WLAN system is provided, and the method is applied to a station STA in a wireless local area network and includes:

receiving scheduling information sent by an access point AP;

obtaining the scheduling information by means of parsing, where the scheduling information includes information about a first station that performs uplink transmission on the channel and information about a second station that performs downlink transmission on the channel at the same time, or the scheduling information includes information about a third station that simultaneously performs uplink and downlink transmission on the channel; and transmitting, by the first station, the second station, or the third station, data according to the scheduling information.

With reference to the sixth aspect, in a first possible implementation manner of the sixth aspect, the transmitting data according to the scheduling information includes:

after receiving of a trigger frame that carries the scheduling information is completed, sending, by the first station, an uplink data frame after waiting for SIFS, where a legacy preamble in the uplink data frame and a legacy preamble in a downlink data frame sent by the AP to the second station are simultaneously sent and have same content; or after receiving of a trigger frame that carries the scheduling information is completed, sending, by the third station, an uplink data frame immediately, where a legacy preamble in the uplink data frame is the same as a legacy preamble in a downlink data frame sent by the AP to the third station.

With reference to the first possible implementation manner of the sixth aspect, in a second possible implementation manner of the sixth aspect, the legacy preamble includes a rate field and a length field, and a value of the rate field and a value of the length field meet: receive duration RXTIME that is calculated according to the value of the rate field and the value of the length field is not less than duration of full-duplex transmission including an acknowledgement frame.

With reference to any one of the sixth aspect, or the first to the second possible implementation manners of the sixth aspect, in a third possible implementation manner of the third aspect, the scheduling information further includes transmission duration or an upper limit of transmission duration of the uplink data frame sent by the first station or the third station, or transmission duration or an upper limit of transmission duration of the downlink data frame sent to the second station or the third station.

With reference to the third possible implementation manner of the sixth aspect, in a fourth possible implementation manner of the sixth aspect, if the transmission duration of the uplink data frame sent by the first station or the third station is greater than the transmission duration of the downlink data frame sent by the AP, and an absolute value of a difference between the two is greater than the SIFS, the scheduling information further includes:

an interrupt location and interrupt duration in an uplink data frame transmission process of the first station or the third station; and the transmitting data according to the scheduling information further includes:

stopping, by the first station or the third station, sending the uplink data frame at the interrupt location in the uplink data frame transmission process, and after the interrupt duration elapses, resuming sending the uplink data frame.

With reference to the third possible implementation manner of the sixth aspect, in a fifth possible implementation manner of the sixth aspect, if the transmission duration of the downlink data frame sent by the AP is greater than the transmission duration of the uplink data frame sent by the first station or the third station, and an absolute value of a difference between the two is greater than the SIFS, the scheduling information further includes:

an interrupt location and interrupt duration in a downlink data frame transmission process of the AP; and the transmitting data according to the scheduling information further includes:

stopping, by the second station or the third station at the interrupt location in transmitting the downlink data frame sent by the AP, receiving the downlink data frame sent by the AP, and after the interrupt duration elapses, resuming receiving the downlink data frame sent by the AP.

With reference to any one of the sixth aspect, or the first to the fifth possible implementation manners of the sixth aspect, in a sixth possible implementation manner of the sixth aspect, the method further includes:

performing, by the first station, the second station, or the third station, channel self-interference measurement in transmission duration of the legacy preamble.

According to a seventh aspect, a network-side device is provided, including a transceiver, a processor, and a memory, where the memory is configured to store one or more executable programs, which are used to configure the processor;

the processor is configured to: obtain use permission of a channel; and after obtaining the use permission of the channel, determine scheduling information for a station participating in full-duplex transmission, where the scheduling information includes information about a first station that performs uplink transmission on the channel and information about a second station that performs downlink transmission on the channel at the same time, or the scheduling information includes information about a third station that simultaneously performs uplink and downlink transmission on the channel; and the transceiver is configured to send the scheduling information.

With reference to the seventh aspect, in a first possible implementation manner of the seventh aspect, the transceiver is further configured to:

after sending of a trigger frame that carries the scheduling information is completed, send a downlink data frame to the second station or the third station after waiting for SIFS, where the downlink data frame includes a legacy preamble, and the legacy preamble in the downlink data frame sent to the second station and a legacy preamble in an uplink data frame sent by the first station are simultaneously sent on the channel and have same content; or the legacy preamble in the downlink data frame sent to the third station and a legacy preamble in an uplink data frame sent by the third station are simultaneously sent on the channel and have same content.

With reference to the first possible implementation manner of the seventh aspect, in a second possible implementation manner of the seventh aspect, the legacy preamble includes a rate field and a length field, and a value of the rate field and a value of the length field meet: receive duration RXTIME that is calculated according to the value of the rate field and the value of the length field is not less than duration of full-duplex transmission including an acknowledgement frame.

With reference to any one of the seventh aspect, or the first to the second possible implementation manners of the seventh aspect, in a third possible implementation manner of the seventh aspect, the scheduling information further includes transmission duration or an upper limit of transmission duration of the uplink data frame sent by the first station or the third station, or transmission duration or an upper limit of transmission duration of the downlink data frame sent to the second station or the third station.

With reference to the third possible implementation manner of the seventh aspect, in a fourth possible implementation manner of the seventh aspect, if the transmission duration of the uplink data frame sent by the first station or the third station is greater than the transmission duration of the downlink data frame sent by the access point AP, and an absolute value of a difference between the two is greater than the short interframe space SIFS, the scheduling information further includes an interrupt location and interrupt duration in an uplink data frame transmission process of the first station or the third station; and the transceiver is further configured to:

stop, at the interrupt location in the uplink data frame transmission process of the first station or the third station, receiving the uplink data frame sent by the first station or the third station, and start receiving an acknowledgement frame sent by the second station or the third station; and after the interrupt duration elapses, resume receiving the uplink data frame sent by the first station or the third station.

With reference to the third possible implementation manner of the seventh aspect, in a fifth possible implementation manner of the seventh aspect, if the transmission duration of the downlink data frame sent by the AP to the second station or the third station is greater than the transmission duration of the uplink data frame sent by the first station or the third station, and an absolute value of a difference between the two is greater than the SIFS, the scheduling information further includes:

an interrupt location and interrupt duration in a downlink data frame transmission process of the AP; and the transceiver is further configured to:

stop, at the interrupt location in transmitting the downlink data frame of the AP, transmitting the downlink data frame, and start sending an acknowledgement frame to the first station or the third station; and after the interrupt duration elapses, resume sending the downlink data frame.

With reference to any one of the seventh aspect, or the first to the fifth possible implementation manners of the seventh aspect, in a sixth possible implementation manner of the seventh aspect, the processor is configured to:

perform channel self-interference measurement when the trigger frame is being sent.

With reference to any one of the seventh aspect, or the first to the sixth possible implementation manners of the seventh aspect, in a seventh possible implementation manner of the seventh aspect, the information about the first station, the information about the second station, or the information about the third station is specifically:

an identifier of a single station, an address of a single station, a group identifier, or a group address.

With reference to any one of the seventh aspect, or the first to the seventh possible implementation manners of the seventh aspect, in an eighth possible implementation manner of the seventh aspect, when a total quantity of the first station and the third station is greater than 2, the scheduling information further includes information about resource allocation in uplink multi-user multiple input multiple output MU-MIMO or information about resource allocation in uplink orthogonal frequency division multiple access OFDMA; or when a total quantity of the second station and the third station is greater than 2, the scheduling information further includes information about resource allocation in downlink multi-user multiple input multiple output MU-MIMO or information about resource allocation in downlink orthogonal frequency division multiple access OFDMA.

According to an eighth aspect, an access point AP apparatus is provided, including the communications apparatus according to any one of the seventh aspect, or the first to the eighth possible implementation manners of the seventh aspect.

According to a ninth aspect, user equipment is provided, including a transceiver, a processor, and a memory, where the memory is configured to store one or more executable programs, which are used to configure the processor;

the transceiver is configured to receive scheduling information sent by an access point AP;

the processor is configured to obtain the scheduling information by means of parsing, where the scheduling information includes information about a first station that performs uplink transmission on the channel and information about a second station that performs downlink transmission on the channel at the same time, or the scheduling information includes information about a third station that simultaneously performs uplink and downlink transmission on the channel; and the transceiver is configured to transmit data according to the scheduling information when a station STA on which the communications apparatus is located is the first station, the second station, or the third station.

With reference to the ninth aspect, in a first possible implementation manner of the ninth aspect, the transceiver is specifically configured to:

after receiving of a trigger frame that carries the scheduling information is completed, if the STA on which the communications apparatus is located is the first station, send an uplink data frame after waiting for SIFS, where a legacy preamble in the uplink data frame and a legacy preamble in a downlink data frame sent by the AP to the second station are simultaneously sent and have same content; or after receiving of a trigger frame that carries the scheduling information is completed, if the STA on which the communications apparatus is located is the third station, send an uplink data frame immediately, where a legacy preamble in the uplink data frame is the same as a legacy preamble in a downlink data frame sent by the AP to the third station.

With reference to the first possible implementation manner of the ninth aspect, in a second possible implementation manner of the ninth aspect, the legacy preamble includes a rate field and a length field, and a value of the rate field and a value of the length field meet: receive duration RXTIME that is calculated according to the value of the rate field and the value of the length field is not less than duration of full-duplex transmission including an acknowledgement frame.

With reference to any one of the ninth aspect, or the first to the second possible implementation manners of the ninth aspect, in a third possible implementation manner of the ninth aspect, the scheduling information further includes transmission duration or an upper limit of transmission duration of the uplink data frame sent by the first station or the third station, or transmission duration or an upper limit of transmission duration of the downlink data frame sent to the second station or the third station.

With reference to the third possible implementation manner of the ninth aspect, in a fourth possible implementation manner of the ninth aspect, if the transmission duration of the uplink data frame sent by the first station or the third station is greater than the transmission duration of the downlink data frame sent by the AP, and an absolute value of a difference between the two is greater than the SIFS, the scheduling information further includes:

an interrupt location and interrupt duration in an uplink data frame transmission process of the first station or the third station; and the transceiver is further configured to:

when the STA on which the communications apparatus is located is the first station or the third station, stop sending the uplink data frame at the interrupt location in the uplink data frame transmission process, and after the interrupt duration elapses, resume sending the uplink data frame.

With reference to the third possible implementation manner of the ninth aspect, in a fifth possible implementation manner of the ninth aspect, if the transmission duration of the downlink data frame sent by the AP is greater than the transmission duration of the uplink data frame sent by the first station or the third station, and an absolute value of a difference between the two is greater than the SIFS, the scheduling information further includes:

an interrupt location and interrupt duration in a downlink data frame transmission process of the AP; and the transceiver is further configured to:

when the STA on which the communications apparatus is located is the second station or the third station, stop, at the interrupt location in transmitting the downlink data frame sent by the AP, receiving the downlink data frame sent by the AP, and after the interrupt duration elapses, resume receiving the downlink data frame sent by the AP.

With reference to any one of the ninth aspect, or the first to the fifth possible implementation manners of the ninth aspect, in a sixth possible implementation manner of the ninth aspect, the processor is further configured to:

after receiving of the trigger frame is completed, perform channel self-interference measurement in transmission duration of the legacy preamble.

According to a tenth aspect, a station STA apparatus is provided, including the communications apparatus according to any one of the ninth aspect, or the first to the sixth possible implementation manners of the ninth aspect.

According to the method provided in the embodiments of the present invention, scheduling information is determined after an AP obtains use permission of a channel by means of contention, and a STA participating in full-duplex transmission is scheduled. The scheduling information includes a transmission direction of the STA. Therefore, full-duplex communication between the AP and the STA can be implemented in a WLAN system.

DETAILED DESCRIPTION

Figure 1:
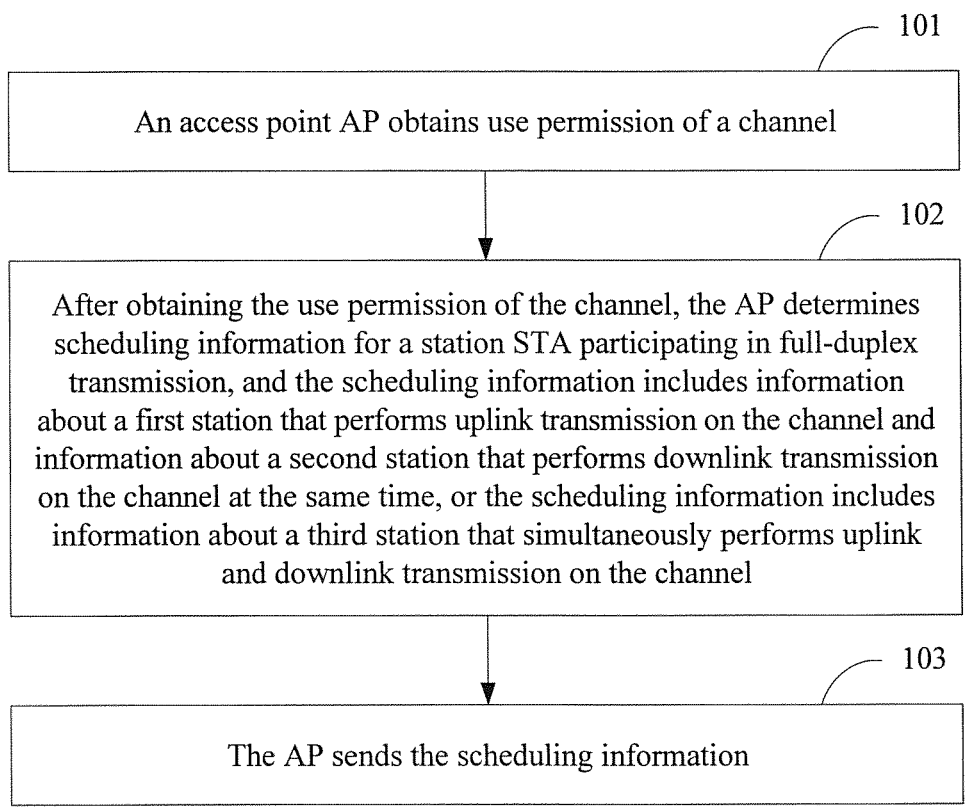
FIG. 1 is a flowchart of a full-duplex communication method in a WLAN system according to an embodiment of the present invention.

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The following describes the embodiments of the present invention in detail with reference to the accompanying drawings in this specification.

In the embodiments of the present invention, a STA does not directly contend for a channel. Instead, after obtaining use permission of the channel, an AP centrally schedules and controls, by using a specific scheduling algorithm, STAs to perform uplink-only transmission, downlink-only transmission, or simultaneous uplink and downlink transmission. Specifically, multiple STAs with a same transmission direction are allowed to simultaneously perform unidirectional transmission by means of MU-MIMO and/or OFDMA, that is, the AP simultaneously sends downlink signals to the multiple STAs, or simultaneously receives uplink signals from the multiple STAs. Multiple STAs with different transmission directions are allowed to simultaneously perform uplink and downlink transmission by means of full duplex or in combination with MU-MIMO and/or OFDMA, that is, the AP simultaneously sends downlink signals to the multiple STAs, and simultaneously receives uplink signals from the multiple STAs. In the embodiments of the present invention, a STA participating in uplink sending in full-duplex transmission is referred to as an "uplink STA" for short, a STA participating in downlink receiving in full-duplex transmission is referred to as a "downlink STA" for short, and when a STA supporting full-duplex transmission may be both an uplink STA and a downlink STA, the STA is referred to as a full-duplex STA.

In a conventional multi-user transmission technology such as MU-MIMO or OFDMA, an uplink data frame or a downlink data frame can only be unidirectionally transmitted between an AP and multiple STAs at the same time, and uplink-downlink bidirectional transmission cannot be simultaneously performed. Therefore, a full-duplex technology needs to be used. In the full-duplex technology, a full-duplex communications node can simultaneously perform uplink and downlink transmission on a same radio channel. In order to cancel strong self-interference from a transmitted signal to a received signal within the full-duplex communications node, a self-interference cancellation operation needs to be performed on a receiver unit such as an antenna, an intermediate radio frequency, or a baseband. Therefore, the full-duplex communications node needs to perform effective channel self-interference detection. In the embodiments of the present invention, the AP may perform channel self-interference measurement when sending the trigger frame.

A reason why the foregoing AP can implement centralized scheduling and control lies in a fact that: First, the AP has information about a volume of to-be-received downlink data of STAs in a downlink direction, and the AP may obtain information about a volume of to-be-sent uplink data of STAs in an uplink direction through active reporting by the STAs, or in a manner in which the AP queries the information and then the STAs report the information. In addition, the AP may further obtain information, such as channel state information or signal to interference plus noise ratio (SINR for short) of a channel, about uplink and downlink channels between the AP and the STAs through measurement by the AP, and in a manner in which the STAs obtains the information through measurement and then reports the information. Therefore, based on the foregoing information, the AP can schedule multiple STAs to perform multi-user transmission in a proper manner such as full duplex, MU-MIMO, or OFDMA.

As shown in FIG. 1, FIG. 1 is a flowchart of a full-duplex communication method in a WLAN system according to an embodiment of the present invention. The method is applied to an access point AP in a wireless local area network and includes the following steps.

Step 101: The access point AP obtains use permission of a channel.

In step 101, after determining that a STA needs to receive or send data, the AP may obtain the use permission of the channel by means of channel contention. For example, the AP may obtain the use permission of the channel by using a conventional technology in a protocol such as 802.11a, 802.11n, or 802.11ac. For example, the AP obtains the use permission of the channel in an RTS/CTS (Request To Send/Clear To Send) process or a CTS-to-self process.

For example, in multi-node full-duplex transmission, the AP first sends an RTS frame. In the RTS frame, a receiver address RA field is set as an address of a STA participating in full-duplex transmission and a transmitter address TA field is set as an address of the AP. After the STA returns CTS, the AP obtains the use permission of the channel.

For another example, the AP may transmit a CTS-to-self frame by using relatively high power. In the CTS-to-self frame, a receiver address RA field is set as an address of the AP, a duration field is set as a value greater than or equal to full-duplex transmission duration from an end of the CTS-to-self frame to an end of an acknowledgement frame. The acknowledgement frame is an ACK (Acknowledgement, individual acknowledgement) frame or a BA (Block Acknowledgement) frame. In this way, each STA within coverage of the AP can receive the CTS-to-self frame and no longer attempts to contend for the channel in the duration. This ensures that the AP obtains the use permission of the channel in the duration.

Step 102: After obtaining the use permission of the channel, the AP determines scheduling information for a station STA participating in full-duplex transmission, and the scheduling information includes information about a first station that performs uplink transmission on the channel and information about a second station that performs downlink transmission on the channel at the same time, or the scheduling information includes information about a third station that simultaneously performs uplink and downlink transmission on the channel.

Figure 2:
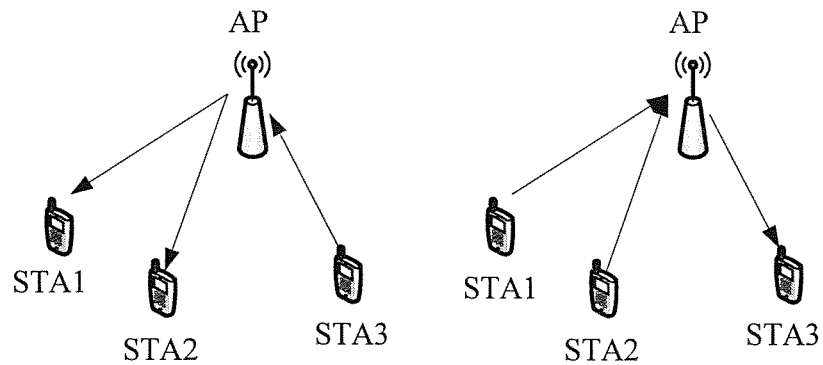
FIG. 2(a) and FIG. 2(b) and FIG. 2(c) and FIG. 2(d) are a schematic diagram of a multi-node full-duplex communication process.
Figure 2:
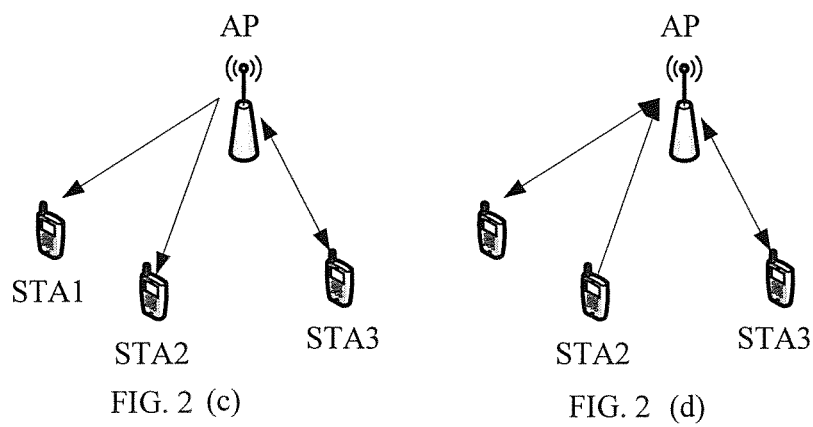

In this implementation manner, full duplex means that a same communication resource is used for simultaneously performing uplink and downlink transmission. In this embodiment of the present invention, two full-duplex manners may be supported. One manner is single-node full-duplex transmission, that is, only the AP supports full-duplex communication, but a STA still uses a half-duplex manner, that is, at least one STA receives a downlink signal from the AP, and at least one STA transmits an uplink signal to the AP, as shown in FIG. 2(a) and FIG. 2(b). For ease of description, in this embodiment of the present invention, a STA that performs uplink-only transmission on a channel is referred to as a first station, and a STA that performs downlink transmission on the same channel at the same time is referred to as a second station (where the first station and the second station are stations supporting the foregoing half-duplex manner). The other manner is multi-node full-duplex transmission, that is, the AP and at least one STA both perform transmission in a full-duplex manner. Certainly, in addition to a STA with a full-duplex function, the AP is allowed to perform downlink transmission with at least one half-duplex downlink STA at the same time, as shown in FIG. 2(c) and FIG. 2(d). For ease of description, a STA that simultaneously performs uplink and downlink transmission on a channel is referred to as a third station (where the third station is a STA with the full-duplex function).

Step 103: The AP sends the scheduling information.

Optionally, step 104: The AP, the first station, and the second station, or the AP and the third station complete full-duplex transmission according to the scheduling information.

The scheduling information in the foregoing steps 102 to 104 may include other information according to different actual situations. For example, in a downlink direction, as a sending party, the AP can always determine a length of a downlink data frame to be sent to the second station or the third station. In an uplink direction, in one case, the AP may determine a modulation and coding scheme used by the first station or the third station for sending an uplink data frame, and an uplink transmission data volume of the first station or the third station, and therefore, the AP can determine lengths of all uplink data frames to be sent by the first station or the third station. In this case, the scheduling information sent by the AP may include transmission duration of each uplink data frame sent by the uplink first station or the third station, or include transmission duration of an uplink data frame sent by a STA, in the first station or the third station, with maximum transmission duration of an uplink data frame, and the maximum transmission duration of the uplink data frame. In the uplink direction, in another case, the AP cannot accurately determine a modulation and coding scheme used by the first station or the third station for sending an uplink data frame, and an uplink transmission data volume of the first station or the third station, and therefore, the AP cannot determine lengths of all uplink data frames to be sent by the uplink first station or the third station. In this case, the scheduling information sent by the AP may include an upper limit of transmission duration of an uplink data frame, and transmission duration for sending an uplink data frame by each first station or each third station cannot exceed this upper limit. Data transmission duration is typically in a unit of time such as millisecond (ms) or microsecond (µs) or in a unit of OFDM symbol length.

Because two communication parties cannot coordinate respective data frame lengths, a party that first finishes data sending needs to add an unwanted trailing bit for alignment, resulting in a resource waste. In this embodiment of the present invention, data sending or data receiving by all STAs may be controlled and scheduled by the AP, thereby avoiding a resource waste caused by adding an unwanted trailing bit for alignment.

Specifically, for example, the AP may preferentially schedule stations of which an absolute value of a difference between duration of an uplink data frame and duration of a downlink data frame falls within a SIFS (Short Inter-frame Space, short interframe space) time to perform transmission in one scheduling period. For example, a STA1 needs to send an uplink data frame, and a STA2 needs to receive a downlink data frame. Duration of the uplink data frame sent by the STA1 is greater than duration of the downlink data frame received by the STA2, and a difference between the two is less than the SIFS time. The AP schedules the STA1 and the STA2 to one scheduling period. In this case, in step 104, when the STA2 completes receiving of the downlink data frame, the STA1 is still sending the uplink data frame. The STA2 sends an acknowledgement frame to the AP after waiting for the SIFS time. At this time, because the STA1 has completed sending of the uplink data frame, the acknowledgement frame sent by the STA2 does not conflict with the uplink data frame sent by the STA1. In addition, after completing receiving of the uplink data frame sent by the STA1, the AP sends an acknowledgement frame to the STA1 after waiting for the SIFS time. At this time, because the STA2 has completed receiving of the downlink data frame, the acknowledgement frame sent by the AP does not conflict with the downlink data frame received by the STA2.

More specifically, if the AP cannot determine the lengths of all the uplink data frames to be sent by the first station or the third station, a first signaling field in an HEW preamble in an uplink data frame sent by the first station or the third station carries information about a length of the uplink data frame sent by the first station or the third station. Therefore, after receiving the first signaling field in the HEW preamble in the uplink data frame sent by the first station or the third station, the AP can accurately learn the length of the uplink data frame sent by the first station or the third station, and select a downlink data frame with a proper length to transmit data with the first station or the third station. In this way, an uplink data frame sent to the AP and a downlink data frame sent to the first station and the third station have approximate lengths, that is, a length difference between the uplink and downlink data frames are within a SIFS time range. Then, information about a length of a downlink data frame is carried in a second signaling field in an HEW preamble in the downlink data frame, thereby ensuring that the second station or the third station correspondingly receives the downlink data frame.

Optionally, during full-duplex data transmission in a scheduling period, if transmission duration of an uplink data frame sent by the first station or the third station is greater than transmission duration of a downlink data frame sent by the access point AP, and an absolute value of a difference between the two is greater than short interframe space SIFS, the scheduling information further includes an interrupt location and interrupt duration in an uplink data frame transmission process of the first station or the third station. The interrupt location makes the first station or the third station that is sending the uplink data frame suspend, according to a moment or a time point indicated by the interrupt location, sending of the uplink data frame. If the transmission duration of the uplink data frame sent by the first station or the third station is greater than the transmission duration of the downlink data frame sent by the AP, the interrupt location is generally set as a location that is the SIFS time later than completing transmission of the downlink data frame sent by the AP, and the interrupt duration is not less than duration of an acknowledgement frame. In this case, in step 104, the AP stops, at the interrupt location in the uplink data frame transmission process of the first station or the third station, receiving the uplink data frame sent by the first station or the third station, and starts receiving an acknowledgement frame sent by the second station or the third station; and after the interrupt duration elapses, resumes receiving the uplink data frame sent by the first station or the third station. For example, a STA1 needs to send an uplink data frame, and a STA2 needs to receive a downlink data frame. Duration of the uplink data frame sent by the STA1 is greater than duration of the downlink data frame received by the STA2, and a difference between the two is greater than the SIFS time. The AP schedules the STA1 and the STA2 to one scheduling period. When the STA2 completes receiving of the downlink data frame, the STA1 is still sending the uplink data frame. To avoid interference to an acknowledgement frame sent by the STA2, the STA1 suspends, at the interrupt location in the scheduling information, sending of the uplink data frame, and hands over use permission of an uplink channel to the STA2 for sending the acknowledgement frame. After the STA2 completes sending of the acknowledgement frame, the STA1 resumes sending the uplink data frame.

Similarly, if transmission duration of a downlink data frame sent by the AP to the second station or the third station is greater than transmission duration of an uplink data frame sent by the first station or the third station, and an absolute value of a difference between the two is greater than SIFS, the scheduling information further includes an interrupt location and interrupt duration in a downlink data frame transmission process of the AP. Correspondingly, in step 104, in order that sending or receiving of an acknowledgement frame is not affected, the AP suspends, at the interrupt location of the uplink data frame of the AP, transmission of the downlink data frame sent by the AP, and sends an acknowledgement frame to a STA corresponding to an uplink data frame of the AP. The interrupt location is a location that is the SIFS time later than completing transmission of the downlink data frame sent by the AP, and the interrupt duration is not less than duration of the acknowledgement frame. In this way, a downlink STA can suspend, at the interrupt location indicated by the AP, receiving of the downlink data frame sent by the AP; and at an interrupt end moment, resume receiving a remaining part of the downlink data frame from the AP.

In the foregoing implementation manners of step 104, sending of the uplink data frame sent by the first station or the third station is suspended, or sending of the downlink data frame sent by the AP is suspended, thereby avoiding a problem of a resource waste caused when an unwanted trailing bit needs to be added to align uplink and downlink data frames of a sending party and a receiving party because lengths of the uplink and downlink data frames are inconsistent.

In another aspect, the use permission of the channel may be shared among multiple users in the implementation manners. If a total quantity of the first station and the third station in the STA participating in full-duplex transmission is greater than 2, the scheduling information further includes information about resource allocation in uplink multi-user multiple input multiple output MU-MIMO or information about resource allocation in uplink orthogonal frequency division multiple access OFDMA; or when a total quantity of the second station and the third station is greater than 2, the scheduling information further includes information about resource allocation in downlink multi-user multiple input multiple output MU-MIMO or information about resource allocation in downlink orthogonal frequency division multiple access OFDMA. The scheduling information may be carried in a trigger frame, or may be carried in physical layer signaling in a subsequent downlink data frame.

The following describes implementation processes of the foregoing steps in detail with reference to signaling in a related standard.

In step 103, after obtaining the use permission of the channel and waiting for a SIFS time, the AP sends the scheduling information to the STA participating in full-duplex transmission. The scheduling information may be sent by using a trigger frame.

In the foregoing implementation manners, various types of information may use various possible structures. The trigger frame may be used to send, by using physical layer signaling, the scheduling information to the STA participating in full-duplex transmission, that is, the scheduling information is sent by using a preamble in the trigger frame, for example, a first or second signaling field. Alternatively, the trigger frame may be used to send, by using a MAC control frame, the scheduling information to the STA participating in full-duplex transmission, that is, a MAC control frame including the scheduling information is sent by using a data field in the trigger frame. Generally, a modulation and coding scheme (MCS for short) with a relatively low order is used in a physical layer signaling field. For example, MCS0 in a WLAN, that is, binary phase shift keying (BPSK for short) modulation and convolutional coding with a bit rate of 1/2, is used. Therefore, even if a signal to interference plus noise ratio (SINR for short) is relatively low, the STA can correctly perform decoding. Similarly, to ensure reliable transmission of the scheduling information, when the scheduling information is sent by using a MAC control frame, a corresponding data field of the MAC control frame may also be transmitted by using an MCS with a relatively low order, for example, MCS0.

Figure 3:
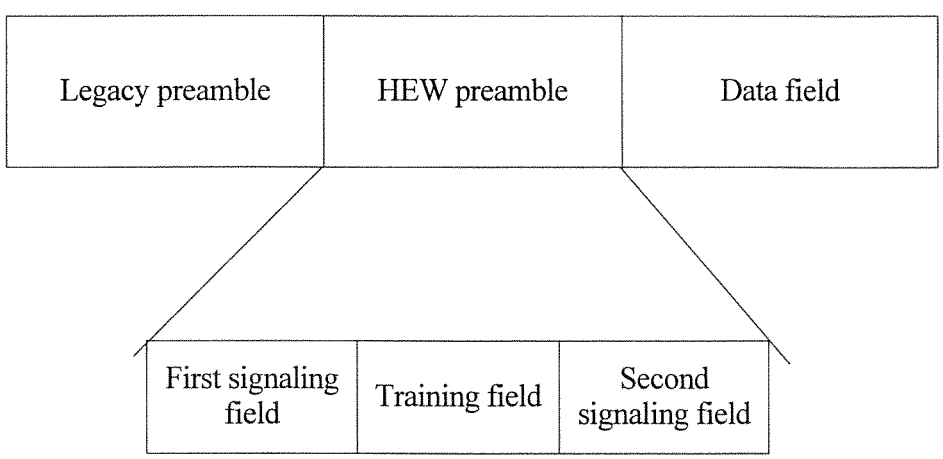
FIG. 3 is a schematic structural diagram of a physical-layer packet in 802.11ax.

For example, as shown in FIG. 3, FIG. 3 shows a structure of a physical layer packet in a wireless local area network. The structure may be applied to 802.11ax. An 802.11ax packet includes a legacy preamble (Legacy Preamble), an HEW (High-Efficiency WLAN, high-efficiency wireless local area network) preamble specific to the 802.11ax packet, and a data field. The legacy preamble is a field existing in all OFDM-based WLAN protocol packets. A length of the legacy preamble is 20 μs, and the legacy preamble includes a legacy short training field (L-STF), a legacy long training field (L-LTF for short), and a legacy signal field (L-SIG for short). The HEW preamble, also referred to as an HE preamble, is referred to as an HEW preamble below. The HEW preamble is a control field specific to the 802.11ax packet and may include at least a first signaling field, a training field, and a second signaling field. The first signaling field and the second signaling field are used to transmit physical layer signaling, the training field is used to provide functions such as automatic gain control and providing a reference signal for channel estimation, and the data field is used to transmit a MAC-layer data unit.

Figure 4:
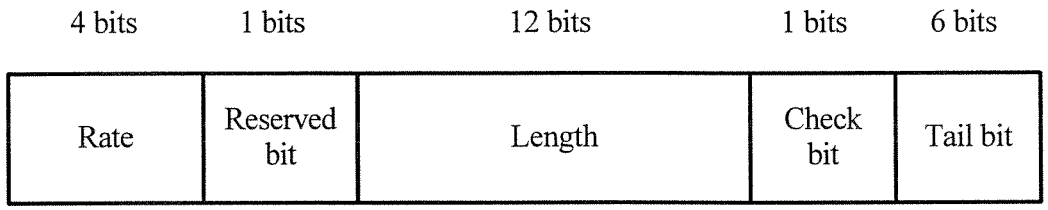
FIG. 4 is a schematic structural diagram of an L-SIG field in a legacy preamble.

Specifically, content of the L-STF field and the L-LTF field in the legacy preamble is constant. A structure of the L-SIG field is shown in FIG. 4, and the L-SIG field includes a 4-bit rate field, one reserved bit, a 12-bit length field, one check bit, and six tail bits. The rate field and the length field are main control information carried in the L-SIG, and the check bit and the tail bits are generated in a channel coding process of the L-SIG according to content of a rate, the reserved bit, and the length field. The length field indicates a data volume in a unit of octet (octet), and the rate field indicates one of eight rates defined in the 802.11a protocol. According to a WLAN protocol, if a WLAN node can receive a preamble in a physical layer packet but cannot correctly receive a field following the legacy preamble, the node may calculate, according to content of a rate field and a length field in an L-SIG, a variable named as RXTIME (receive duration) and with a unit of μs, and then attempt to receive or send data after a delay of the RXTIME time.

A length field in an L-SIG is already used to indicate maximum duration of a full-duplex transmission process including uplink and downlink acknowledgement frames. Therefore, in order to indicate a length of an uplink data frame and a length of a downlink data frame in the full-duplex transmission process, in this embodiment of the present invention, an HEW preamble in the uplink data frame carries information about the length of the uplink data frame in the full-duplex transmission process, and an HEW preamble in the downlink data frame carries information about the length of the downlink data frame in the full-duplex transmission process. For example, the information about the length of the uplink data frame is carried in a first signaling field in the HEW preamble in the uplink data frame, and the information about the length of the downlink data frame is carried in a second signaling field in the HEW preamble in the downlink data frame.

In step 104, at an initial stage of full-duplex data transmission, all nodes participating in full-duplex transmission send a same legacy preamble. Specifically, in a single-node full-duplex transmission manner, after sending of the trigger frame is completed, the AP sends a downlink data frame to the second station after waiting for the SIFS. The downlink data frame includes a legacy preamble, and the legacy preamble in the downlink data frame sent to the second station and a legacy preamble in an uplink data frame sent by the first station are simultaneously sent on the channel and have same content. In a dual-node full-duplex transmission manner, after sending of the trigger frame is completed, the AP sends a downlink data frame to the third station after waiting for the SIFS. The downlink data frame includes a legacy preamble, and the legacy preamble in the downlink data frame sent to the third station and a legacy preamble in an uplink data frame sent by the third station are simultaneously sent on the channel and have same content.

For example, content of a rate field in the legacy preamble is "1101" (which indicates that a rate is 6 Mops), and content of a length field needs to ensure that RXTIME duration calculated according to the rate of 6 Mbps is at least not less than duration of a full-duplex transmission process including an acknowledgement frame.

Figure 5:
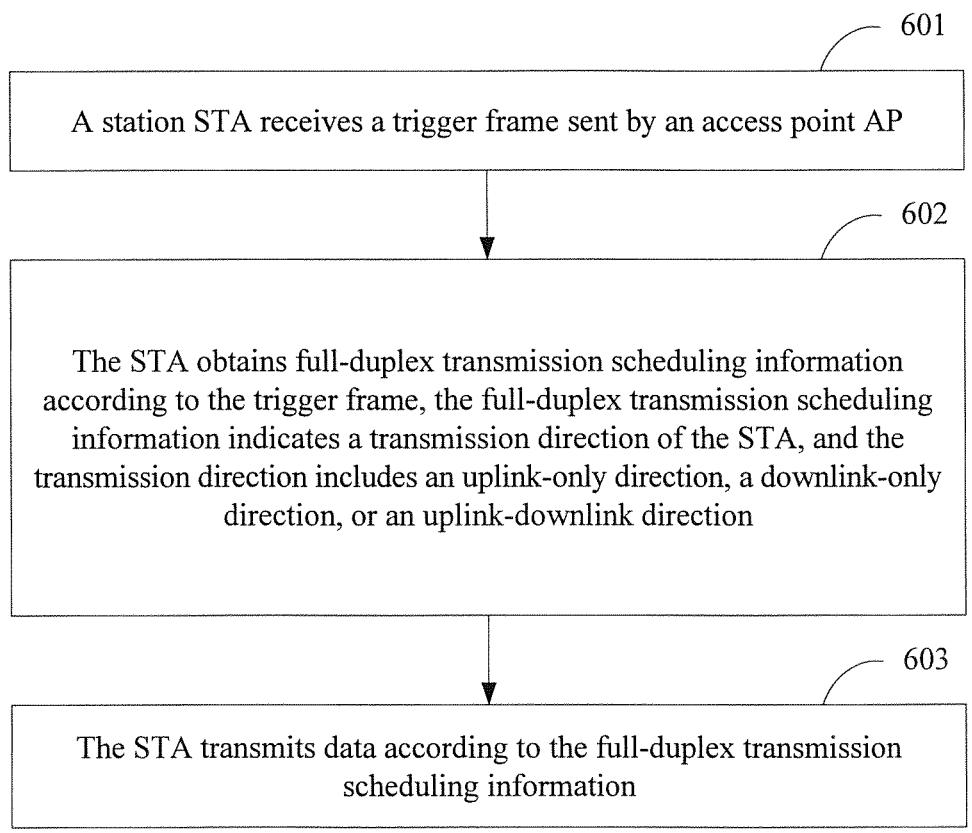
FIG. 5 is a flowchart of another full-duplex communication method in a WLAN system according to an embodiment of the present invention.

The foregoing mainly describes the full-duplex communication method in a WLAN system from a perspective of an AP side. The following describes a full-duplex communication method in a WLAN system from a perspective of a station side. As shown in FIG. 5, FIG. 5 is a flowchart of another full-duplex communication method in a WLAN system according to an embodiment of the present invention. The method includes the following steps.

Step 601: A station STA receives scheduling information sent by an access point AP.

Step 602: The STA obtains the scheduling information, and the scheduling information includes information about a first station that performs uplink transmission on the channel and information about a second station that performs downlink transmission on the channel at the same time, or the scheduling information includes information about a third station that simultaneously performs uplink and downlink transmission on the channel.

Specifically, in step 602, the scheduling information may be carried in a trigger frame. After receiving a trigger frame from the AP, the STA may obtain the scheduling information by demodulating an HEW preamble in the trigger frame or a data field in the trigger frame. The information about the first station, the information about the second station, or the information about the third station is specifically: an identifier of a single station, an address of a single station, a group identifier, or a group address. The STA determines, according to the scheduling information, whether the STA participates in full-duplex transmission, and when participating in the full-duplex transmission, determines whether to perform uplink-only transmission, downlink-only transmission, or simultaneous uplink and downlink transmission (that is, a transmission direction in the full-duplex transmission).

Step 603: The STA transmits data according to the scheduling information.

After receiving the scheduling information carried in the trigger frame, each scheduled STA starts performing full-duplex data transmission according to the transmission direction, indicated by the AP, in the full-duplex transmission or further according to transmission duration of an uplink data frame.

In single-node full-duplex transmission, the first station is a conventional half-duplex STA, and after receiving a downlink trigger frame from the AP, the first station needs to wait for a SIFS time before changing from a receiving state to a sending state. However, in multi-node full-duplex transmission, both the AP and the third station support a full-duplex operation. Therefore, the third station does not need wait for the SIFS time before changing between data sending and receiving states. Once receiving a trigger frame from the AP for scheduling the third station to perform full-duplex transmission, the third station may start sending an uplink data frame immediately after receiving of the trigger frame is completed. Correspondingly, after sending the trigger frame, the AP may start receiving the uplink data frame from the third station. However, instead of immediately starting sending a downlink data frame, the AP waits for a period of time ΔT and then starts sending the downlink data frame. For example, ΔT needs to be not less than transmission duration of a legacy preamble, that is ΔT≥20 μs. In this way, within a delay of ΔT, the STA can perform channel self-interference estimation without being interfered by a downlink signal sent by the AP.

For other content of step 601, step 601, and step 603, refer to the foregoing descriptions of steps 102 to 104. Specific implementation manners of these steps are not repeatedly described herein.

Figure 6:
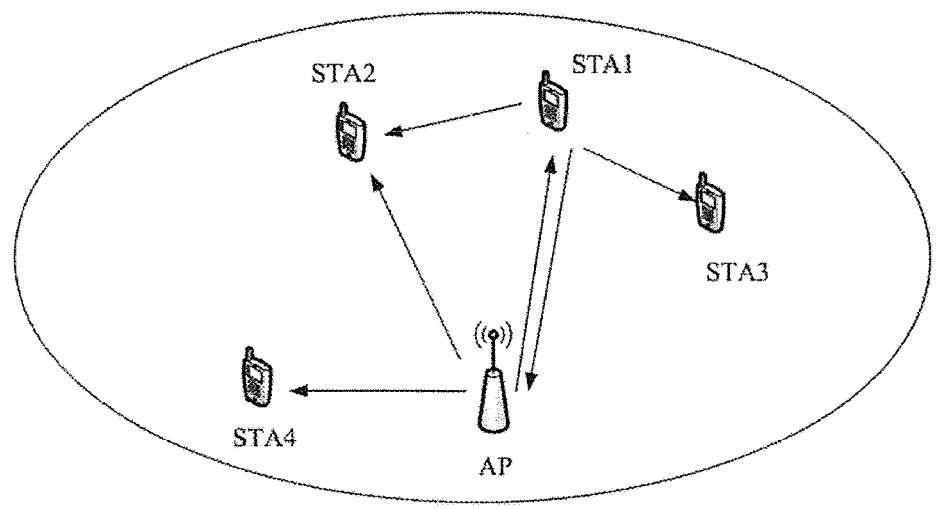
FIG. 6 is a schematic diagram of multi-node full-duplex transmission.

In a full-duplex transmission period, because at least two nodes, that is, the AP and a STA, simultaneously send different data, another node cannot correctly receive a packet from a STA to which the AP is sending data. However, because all nodes participating in full-duplex transmission simultaneously send a same legacy preamble, another node can correctly receive the legacy preamble, so that the another node calculates a correct value of RXTIME according to content of a rate field and a length field in an L-SIG in the legacy preamble, and then attempts to receive or send data after a delay of the RXTIME time. This avoids possible interference from a hidden node to full-duplex transmission. For example, as shown in FIG. 6, FIG. 6 is a schematic diagram of multi-node full-duplex transmission. An AP and a STA1 perform point-to-point full-duplex transmission, and a STA2 may receive signals from the AP and the STA1. Therefore, the STA2 may first receive a legacy preamble in an uplink data frame packet sent by the STA1 (where a field following the legacy preamble cannot be received due to interference caused when the AP starts sending a downlink data frame). If a STA3 can receive a signal from the STA1 but cannot receive a signal from the AP, the STA3 can receive at least a legacy preamble in an uplink data frame packet from the STA1. If a STA4 can receive a signal from the AP but cannot receive a signal from the STA1, an uplink data frame packet sent earlier by the STA1 does not cause interference to the STA4 in receiving a downlink data frame packet from the AP. This ensures that the STA4 can receive at least a legacy preamble in the downlink data frame packet from the AP. Therefore, according to the solution in this embodiment of the present invention, all other nodes can correctly receive a legacy preamble in a data packet sent by an AP or a STA, so that the other nodes obtain a correct value of RXTIME, and then attempt to receive or send data after a delay of the RXTIME time. This avoids possible interference from a hidden node to full-duplex transmission.

The following describes different full duplex scenarios in a WLAN system in detail by using different embodiments.

Embodiment 1

Figure 7:
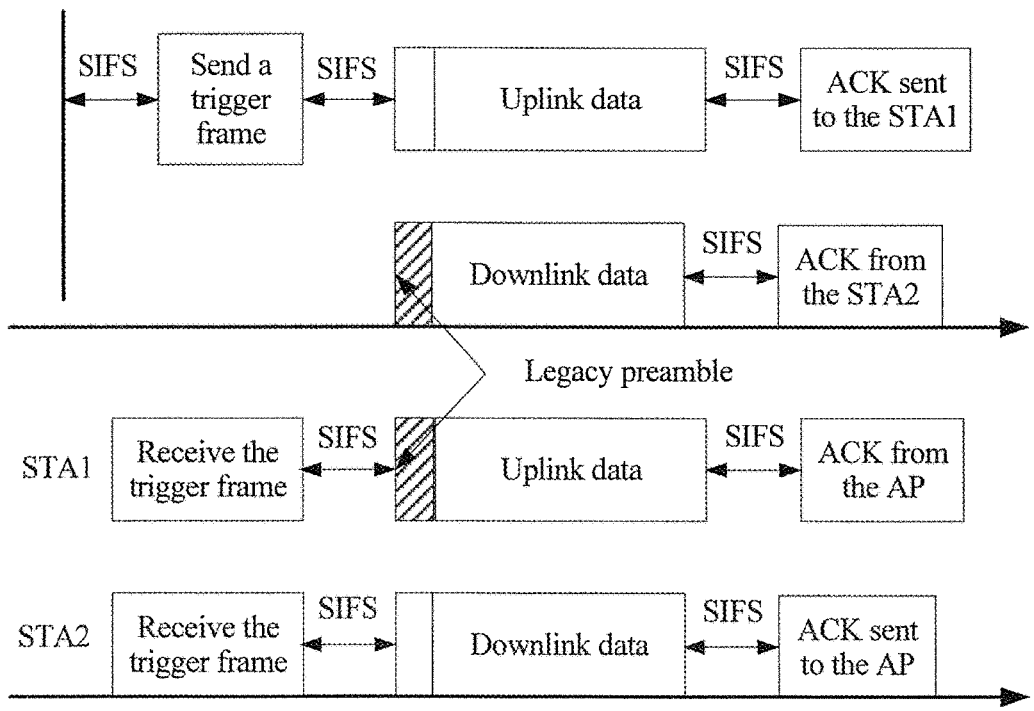
FIG. 7 is a schematic diagram of a first single-node full-duplex transmission process according to an embodiment of the present invention.

As shown in FIG. 7, FIG. 7 is a schematic process diagram of a first type of single-node full-duplex transmission according to an embodiment of the present invention. A STA1 is a first station, and a STA2 is a second station. A length of an uplink data frame sent by the STA1 is less than a length of a downlink data frame sent by an AP, and a difference between the two is less than a SIFS time. The AP first obtains use permission of a channel by means of channel contention, and then initiates a full-duplex transmission process by sending a trigger frame. In this case, scheduling information includes at least an identifier or an address of a STA participating in full-duplex transmission, and a transmission direction of the STA participating in full-duplex transmission.

In a period in which the AP sends the trigger frame, the AP performs channel self-interference estimation. The AP has obtained the use permission of the channel, and all other nodes do not attempt to contend for the channel in this period. Therefore, a prior-art problem that channel self-interference measurement may be interfered by a hidden node is avoided. After completing sending of the trigger frame and waiting for the SIFS time, the AP sends a same legacy preamble to all STAs participating in full-duplex transmission.

The STA1 sends an uplink data frame to the AP, and the AP sends a downlink data frame to the STA2 at the same time. When the STA1 completes sending of the uplink data frame, the STA2 is still receiving data sent by the AP. After waiting for the SIFS time, the AP sends an acknowledgement frame to the STA1. At this time, because the AP has completed sending of the uplink data frame, the acknowledgement frame sent by the AP does not conflict with the downlink data frame sent to the STA2. In addition, after completing receiving of the data sent by the AP and waiting for the SIFS time, the STA2 sends an acknowledgement frame to the AP. At this time, because the AP has completed receiving of data sent by the STA1, the acknowledgement frame sent by the STA2 does not conflict with the uplink data frame sent by the STA1.

Embodiment 2

Figure 8:
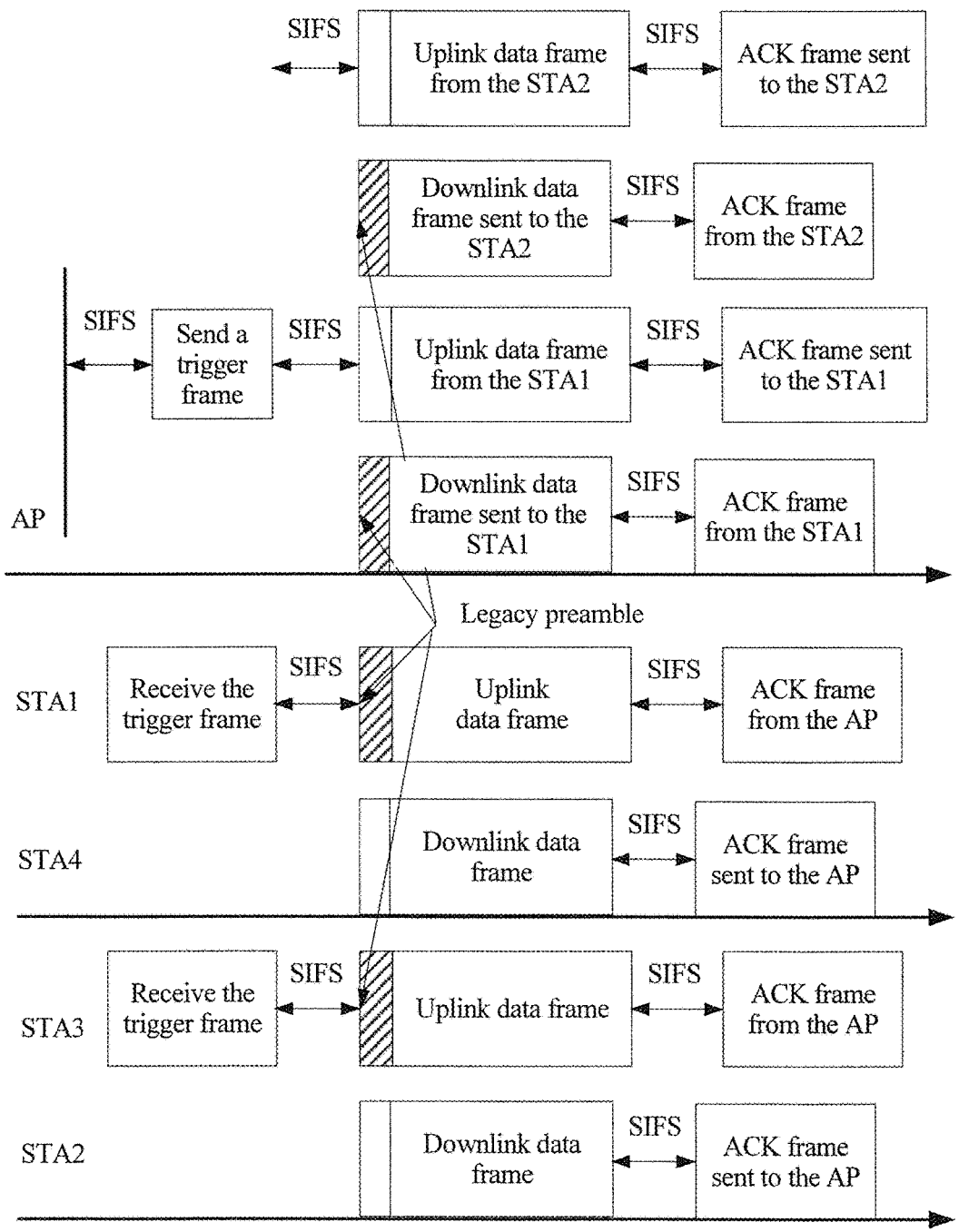
FIG. 8 is a schematic process diagram of a second type of single-node full-duplex transmission according to an embodiment of the present invention.

As shown in FIG. 8, FIG. 8 is a schematic process diagram of a second type of single-node full-duplex transmission according to an embodiment of the present invention. A STA1 and a STA3 are first stations, and a STA2 and a STA4 are second stations. A length of an uplink data frame sent by the STA1 is less than a length of a downlink data frame sent by an AP, and a difference between the two is less than a SIFS time. A length of an uplink data frame sent by the STA3 is less than the length of the downlink data frame sent by the AP, and a difference between the two is less than the SIFS time. The AP first obtains use permission of a channel by means of channel contention, and then initiates a full-duplex transmission process by sending a trigger frame. In this case, scheduling information includes at least an identifier or an address of a STA participating in full-duplex transmission, a transmission direction of the STA participating in full-duplex transmission, information about resource allocation and STA scheduling in uplink MU-MIMO and/or uplink OFDMA, and information about resource allocation and STA scheduling in downlink MU-MIMO and/or downlink OFDMA.

In a period in which the AP sends the trigger frame, the AP performs channel self-interference estimation. The AP has obtained the use permission of the channel, and all other nodes do not attempt to contend for the channel in this period. Therefore, a prior-art problem that channel self-interference measurement may be interfered by a hidden node is avoided. After completing sending of the trigger frame and waiting for the SIFS time, the AP sends a same legacy preamble to all STAs participating in full-duplex transmission.

The STA1 and the STA3 simultaneously send uplink data frames to the AP, and at the same time, the AP sends downlink data frames to the STA2 and the STA4. When the STA1 or the STA3 completes sending of the uplink data frame, the STA2 or the STA 4 is still receiving data sent by the AP. After waiting for the SIFS time, the AP sends an acknowledgement frame to the STA1 or the STA3. At this time, because the AP has completed sending of the uplink data frame, the acknowledgement frame sent by the AP does not conflict with the downlink data frame sent to the STA2 or the STA4. In addition, after completing receiving of the data sent by the AP and waiting for the SIFS time, the STA2 or the STA4 sends an acknowledgement frame to the AP. At this time, because the AP has completed receiving of data sent by the STA1 or the STA3, the acknowledgement frame sent by the STA2 or the STA4 does not conflict with the uplink data frame sent by the STA1 or the STA3.

Embodiment 3

Figure 9:
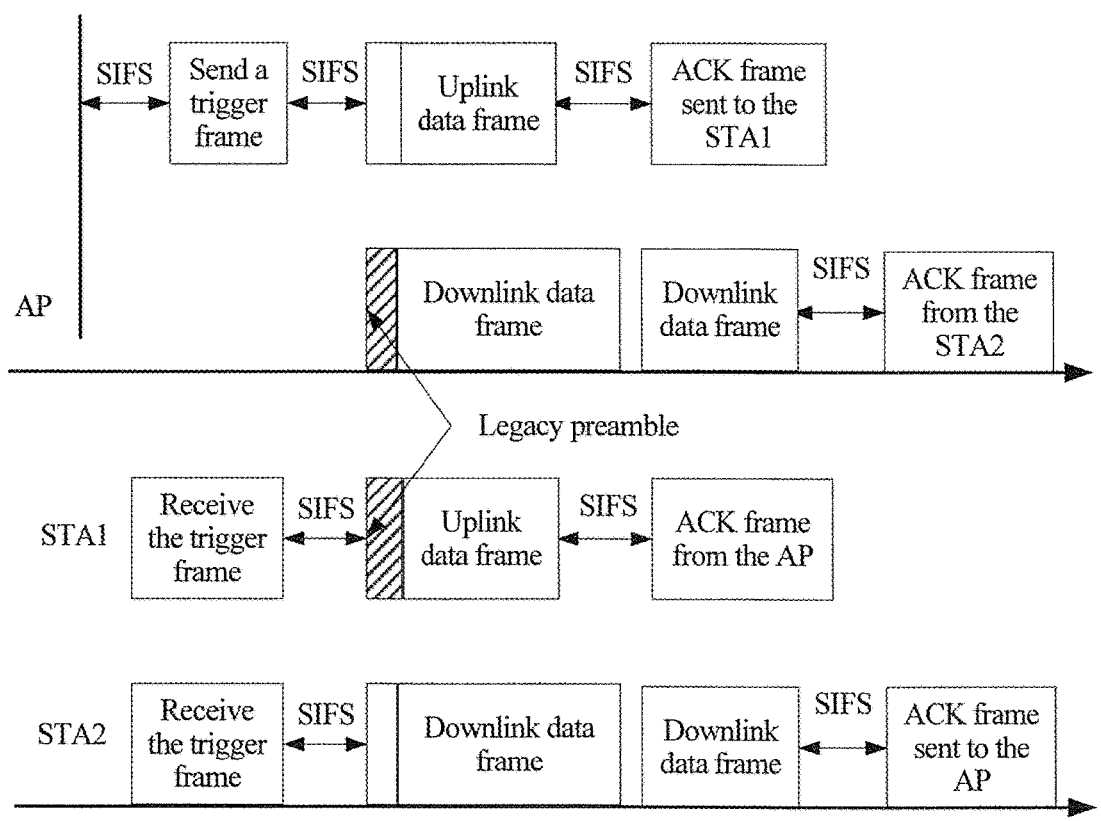
FIG. 9 is a schematic process diagram of a third type of single-node full-duplex transmission according to an embodiment of the present invention.

As shown in FIG. 9, FIG. 9 is a schematic process diagram of a third type of single-node full-duplex transmission according to an embodiment of the present invention. A STA1 is a first station, and a STA2 is a second station. A length of an uplink data frame sent by the STA1 is less than a length of a downlink data frame sent by an AP, and a difference between the two is greater than a SIFS time. The AP first obtains use permission of a channel by means of channel contention, and then initiates a full-duplex transmission process by sending a trigger frame. In this case, scheduling information includes at least an identifier or an address of a STA participating in full-duplex transmission, a transmission direction of the STA participating in full-duplex transmission, and an interrupt location and interrupt duration in a downlink data frame transmission process of the AP.

In a period in which the AP sends the trigger frame, the AP performs channel self-interference estimation. The AP has obtained the use permission of the channel, and all other nodes do not attempt to contend for the channel in this period. Therefore, a prior-art problem that channel self-interference measurement may be interfered by a hidden node is avoided. After completing sending of the trigger frame and waiting for the SIFS time, the AP sends a same legacy preamble to all STAs participating in full-duplex transmission.

The STA1 sends an uplink data frame to the AP, and the AP sends a downlink data frame to the STA2 at the same time. When the STA1 completes sending of the uplink data frame, the STA2 is still receiving data sent by the AP. After waiting for the SIFS time, the AP suspends sending of the downlink data frame sent by the AP and sends an acknowledgement frame to the STA1. At this time, because the AP has not completed sending of the downlink data frame, and the STA2 can determine, according to the interrupt location and the interrupt duration, in the scheduling information, in the downlink data frame transmission process of the AP, that the AP will suspend data sending at this moment, the STA2 does not send an acknowledgement frame to the AP after waiting for the SIFS time.

In addition, after the interrupt duration elapses, the AP resumes sending the downlink data frame to the STA2.

Embodiment 4

Figure 10:
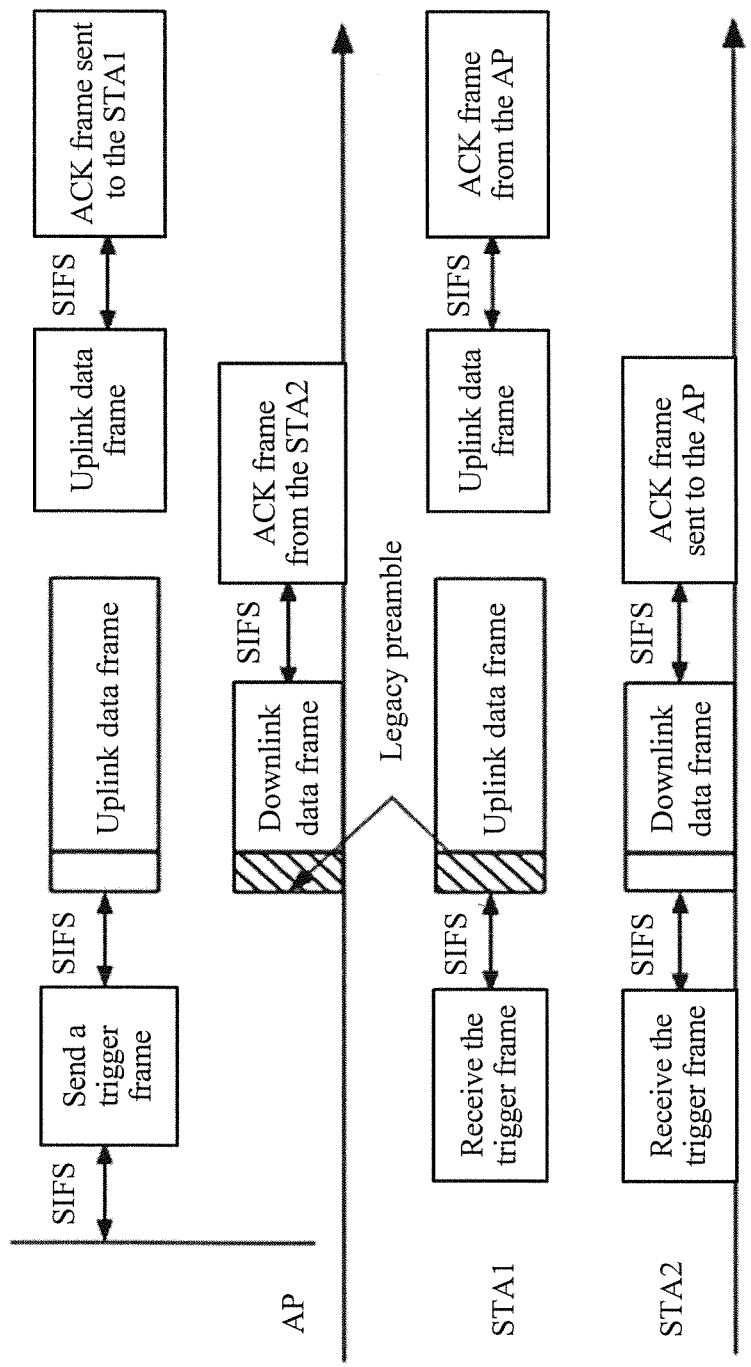
FIG. 10 is a schematic process diagram of a fourth type of single-node full-duplex transmission according to an embodiment of the present invention.

As shown in FIG. 10, FIG. 10 is a schematic process diagram of a fourth type of single-node full-duplex transmission according to an embodiment of the present invention. A STA1 is a first station, and a STA2 is a second station. A length of an uplink data frame sent by the STA1 is greater than a length of a downlink data frame sent by an AP, and a difference between the two is greater than a SIFS time. The AP first obtains use permission of a channel by means of channel contention, and then initiates a full-duplex transmission process by sending a trigger frame. In this case, scheduling information includes at least an identifier or an address of a STA participating in full-duplex transmission, a transmission direction of the STA participating in full-duplex transmission, and an interrupt location and interrupt duration in an uplink data frame transmission process of the STA1.

In a period in which the AP sends the trigger frame, the AP performs channel self-interference estimation. The AP has obtained the use permission of the channel, and all other nodes do not attempt to contend for the channel in this period. Therefore, a prior-art problem that channel self-interference measurement may be interfered by a hidden node is avoided. After completing sending of the trigger frame and waiting for the SIFS time, the AP sends a same legacy preamble to all STAs participating in full-duplex transmission.

The STA1 sends an uplink data frame to the AP, and the AP sends a downlink data frame to the STA2 at the same time. When the AP completes sending of the downlink data frame, the STA1 is still sending data to the AP. To make the STA2 send an acknowledgement frame to the AP on time, after the AP completes sending of the downlink data frame, according to the interrupt location and the interrupt duration, in the scheduling information, in the uplink data frame transmission process of the STA1, the STA1 suspends, after waiting for the SIFS time, sending of the uplink data frame sent by the STA1. The STA2 sends an acknowledgement frame to the AP when transmission interrupt of the uplink data frame sent by the STA1 starts. At this time, because the STA1 has not completed sending of the uplink data frame, the AP does not send an acknowledgement frame to the STA1 in the interrupt duration. After the interrupt duration elapses, the STA1 resumes sending the uplink data frame to the AP.

Embodiment 5

Figure 11:
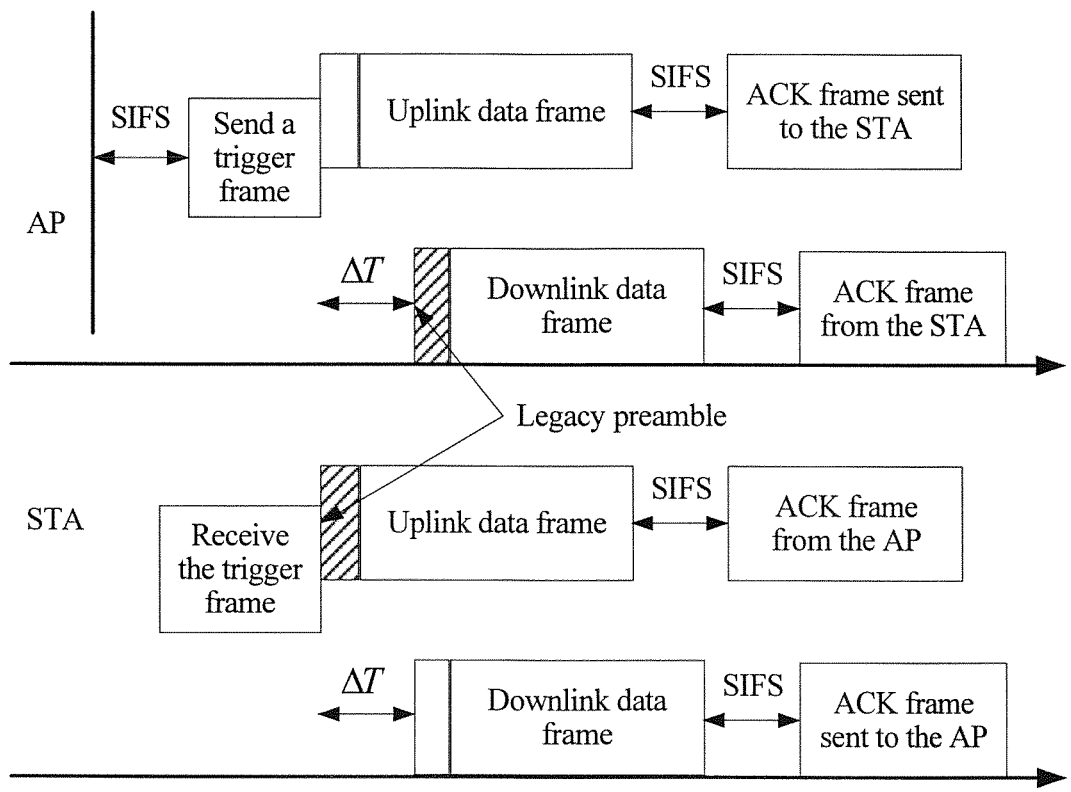
FIG. 11 is a schematic process diagram of a first type of dual-node full-duplex transmission according to an embodiment of the present invention.

As shown in FIG. 11, FIG. 11 is a schematic process diagram of a first type of dual-node full-duplex transmission according to an embodiment of the present invention. A STA is a third station. A length of an uplink data frame sent by the STA is less than a length of a downlink data frame sent by an AP, and a difference between the two is less than a SIFS time. The AP first obtains use permission of a channel by means of channel contention, and then initiates a full-duplex transmission process by sending a trigger frame. In this case, scheduling information includes at least an identifier or an address of a STA participating in full-duplex transmission, and a transmission direction of the STA participating in full-duplex transmission.

In a period in which the AP sends the trigger frame, the AP performs channel self-interference estimation. The AP has obtained the use permission of the channel, and all other nodes do not attempt to contend for the channel in this period. Therefore, a prior-art problem that channel self-interference measurement may be interfered by a hidden node is avoided. After completing sending of the trigger frame and waiting for $\Delta T$, the AP sends the legacy preamble field. For example, $\Delta T$ needs to be not less than transmission duration of the legacy preamble field, that is, $\Delta T \geq 20$ µs. In this way, within a delay of $\Delta T$, the STA can perform channel self-interference estimation without being interfered by a downlink signal sent by the AP. After completing receiving of the trigger frame sent by the AP, the STA participating in full-duplex transmission may immediately send an uplink data frame to the AP instead of sending the uplink data frame after waiting for the SIFS time.

Correspondingly, after completing sending of the trigger frame, the AP immediately starts receiving the uplink data frame from the STA. However, instead of immediately starting sending a downlink data frame to the STA, the AP waits for at least the transmission duration of the legacy preamble and then starts sending the downlink data frame. In this way, in this period of time, the STA can perform channel self-interference estimation without being interfered by the downlink data frame sent by the AP.

When the STA completes sending of the uplink data frame, the STA is still receiving data sent by the AP. After waiting for the SIFS time, the AP sends an acknowledgement frame to the STA. At this time, because the AP has completed sending of the uplink data frame, the AP causes no interference to sending of the acknowledgement frame. In addition, after completing receiving of the data sent by the AP and waiting for the SIFS time, the STA sends an acknowledgement frame to the AP. At this time, because the AP has completed receiving of data sent by the STA, the STA causes no interference to sending of the acknowledgement frame.

Embodiment 6

Figure 12:
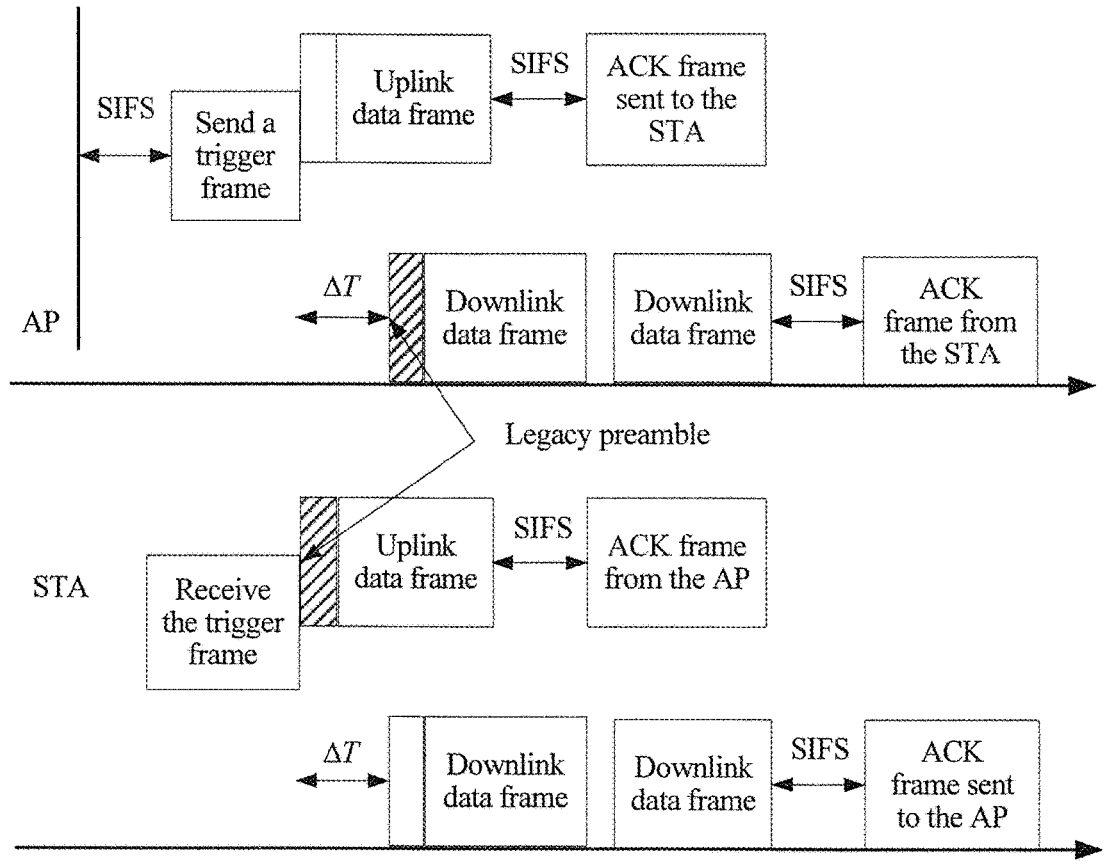
FIG. 12 is a schematic process diagram of a second type of dual-node full-duplex transmission according to an embodiment of the present invention.

As shown in FIG. 12, FIG. 12 is a schematic process diagram of a second type of dual-node full-duplex transmission according to an embodiment of the present invention. A STA is a third station. A length of an uplink data frame sent by the STA is less than a length of a downlink data frame sent by an AP, and a difference between the two is greater than a SIFS time. The AP first obtains use permission of a channel by means of channel contention, and then initiates a full-duplex transmission process by sending a trigger frame. In this case, scheduling information includes at least an identifier or an address of a STA participating in full-duplex transmission, a transmission direction of the STA participating in full-duplex transmission, and an interrupt location and interrupt duration in a downlink data frame receiving process of the STA.

In a period in which the AP sends the trigger frame, the AP performs channel self-interference estimation. The AP has obtained the use permission of the channel, and all other nodes do not attempt to contend for the channel in this period. Therefore, a prior-art problem that channel self-interference measurement may be interfered by a hidden node is avoided. After completing sending of the trigger frame and waiting for $\Delta T$, the AP sends the legacy preamble field. For example, $\Delta T$ needs to be not less than transmission duration of the legacy preamble field, that is, $\Delta T \geq 20$ µs. In this way, within a delay of $\Delta T$, the STA can perform channel self-interference estimation without being interfered by a downlink signal sent by the AP. After completing receiving of the trigger frame sent by the AP, the STA participating in full-duplex transmission may immediately send an uplink data frame to the AP instead of sending the uplink data frame after waiting for the SIFS time.

Correspondingly, after completing sending of the trigger frame, the AP immediately starts receiving the uplink data frame from the STA. However, instead of immediately starting sending a downlink data frame to the STA, the AP waits for at least the transmission duration of the legacy preamble and then starts sending the downlink data frame. In this way, in this period of time, the STA can perform channel self-interference estimation without being interfered by the downlink data frame sent by the AP.

When the STA completes sending of the uplink data frame, the STA is still receiving data sent by the AP. After the STA completes sending of the uplink data frame and the SIFS time elapses, the AP suspends sending of the downlink data frame and sends an acknowledgement frame to the STA. At this time, the AP causes no interference to sending of the acknowledgement frame. In addition, because the STA already learns that that the AP will suspend data sending at this moment, the STA waits in the interrupt duration and does not send an acknowledgement frame to the AP. After the interrupt duration elapses, the AP resumes sending the downlink data frame to the STA.

Embodiment 7

Figure 13:
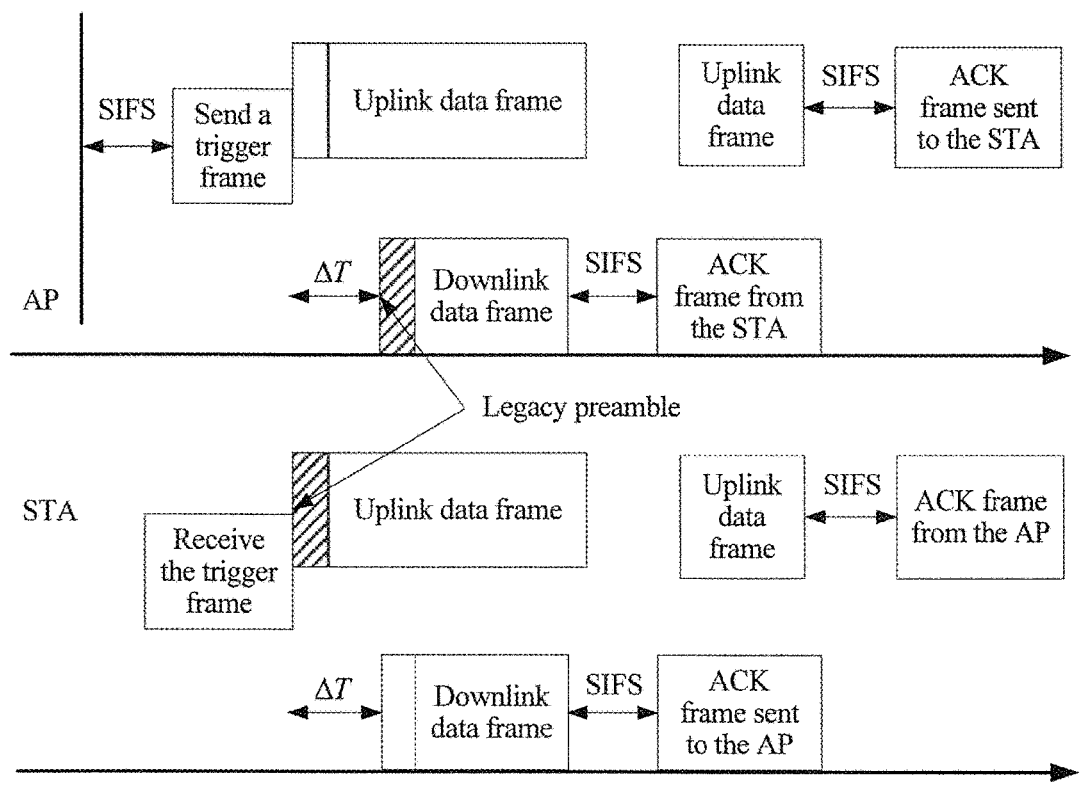
FIG. 13 is a schematic process diagram of a third type of dual-node full-duplex transmission according to an embodiment of the present invention.

As shown in FIG. 13, FIG. 13 is a schematic process diagram of a third type of dual-node full-duplex transmission according to an embodiment of the present invention. A STA is a third station. A length of an uplink data frame sent by the STA is less than a length of a downlink data frame sent by an AP, and a difference between the two is greater than a SIFS time. The AP first obtains use permission of a channel by means of channel contention, and then initiates a full-duplex transmission process by sending a trigger frame. In this case, scheduling information includes at least an identifier or an address of a STA participating in full-duplex transmission, a transmission direction of the STA participating in full-duplex transmission, and an interrupt location and interrupt duration in a downlink data frame receiving process of the STA.

In a period in which the AP sends the trigger frame, the AP performs channel self-interference estimation. The AP has obtained the use permission of the channel, and all other nodes do not attempt to contend for the channel in this period. Therefore, a prior-art problem that channel self-interference measurement may be interfered by a hidden node is avoided. After completing sending of the trigger frame and waiting for $\Delta T$, the AP sends the legacy preamble field. For example, $\Delta T$ needs to be not less than transmission duration of the legacy preamble field, that is, $\Delta T \geq 20$ µs. In this way, within a delay of $\Delta T$, the STA can perform channel self-interference estimation without being interfered by a downlink signal sent by the AP. After completing receiving of the trigger frame sent by the AP, the STA participating in full-duplex transmission may immediately send an uplink data frame to the AP instead of sending the uplink data frame after waiting for the SIFS time.

Correspondingly, after completing sending of the trigger frame, the AP immediately starts receiving the uplink data frame from the STA. However, instead of immediately starting sending a downlink data frame to the STA, the AP waits for at least the transmission duration of the legacy preamble and then starts sending the downlink data frame. In this way, in this period of time, the STA can perform channel self-interference estimation without being interfered by the downlink data frame sent by the AP.

When the AP completes sending of the downlink data frame, the STA is still sending the uplink data frame to the AP. In order to send an acknowledgement frame to the AP on time, the STA suspends sending of the uplink data frame according to the interrupt location and the interrupt duration, in the scheduling information, in the uplink data frame sending process of the STA, and sends the acknowledgement frame to the AP. In addition, because the AP already learns that the STA will suspend data sending at this moment, the AP waits in the interrupt duration and does not send an acknowledgement frame to the STA. After the interrupt duration elapses, the STA resumes sending the uplink data frame to the AP.

Based on an invention concept same as that of the foregoing method, an embodiment of the present invention further provides a communications apparatus.

Figure 14:
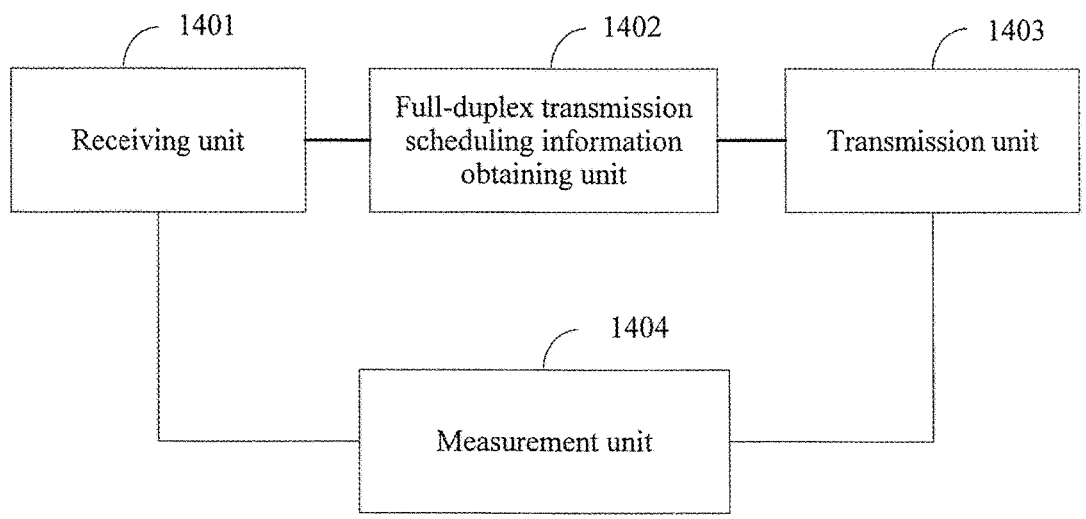
FIG. 14 is a structural diagram of a communications apparatus according to an embodiment of the present invention.

As shown in FIG. 14, an embodiment of the present invention provides a communications apparatus. The apparatus is disposed on an access point AP apparatus in a wireless local area network and includes:

a channel contention unit 1401, configured to obtain use permission of a channel;

a scheduling information determining unit 1402, configured to: after the use permission of the channel is obtained, determine scheduling information for a station participating in full-duplex transmission, where the scheduling information includes information about a first station that performs uplink transmission on the channel and information about a second station that performs downlink transmission on the channel at the same time, or the scheduling information includes information about a third station that simultaneously performs uplink and downlink transmission on the channel; and a transmission unit 1403, configured to send the scheduling information.

For example, the transmission unit 1403 is further configured to:

after sending of a trigger frame that carries the scheduling information is completed, send a downlink data frame to the second station or the third station after waiting for SIFS, where the downlink data frame includes a legacy preamble, and the legacy preamble in the downlink data frame sent to the second station and a legacy preamble in an uplink data frame sent by the first station are simultaneously sent on the channel and have same content; or the legacy preamble in the downlink data frame sent to the third station and a legacy preamble in an uplink data frame sent by the third station are simultaneously sent on the channel and have same content.

For example, the legacy preamble includes a rate field and a length field, and a value of the rate field and a value of the length field meet: receive duration RXTIME that is calculated according to the value of the rate field and the value of the length field is not less than duration of full-duplex transmission including an acknowledgement frame.

For example, the scheduling information further includes transmission duration or an upper limit of transmission duration of the uplink data frame sent by the first station or the third station, or transmission duration or an upper limit of transmission duration of the downlink data frame sent to the second station or the third station.

For example, if the transmission duration of the uplink data frame sent by the first station or the third station is greater than the transmission duration of the downlink data frame sent by the access point AP, and an absolute value of a difference between the two is greater than the short interframe space SIFS, the scheduling information further includes an interrupt location and interrupt duration in an uplink data frame transmission process of the first station or the third station.

The transmission unit 1403 is further configured to:

stop, at the interrupt location in the uplink data frame transmission process of the first station or the third station, receiving the uplink data frame sent by the first station or the third station, and start receiving an acknowledgement frame sent by the second station or the third station; and after the interrupt duration elapses, resume receiving the uplink data frame sent by the first station or the third station.

For example, if the transmission duration of the downlink data frame sent by the AP to the second station or the third station is greater than the transmission duration of the uplink data frame sent by the first station or the third station, and an absolute value of a difference between the two is greater than the SIFS, the scheduling information further includes:

an interrupt location and interrupt duration in a downlink data frame transmission process of the AP.

The transmission unit 1403 is further configured to:

stop, at the interrupt location in transmitting the downlink data frame of the AP, transmitting the downlink data frame, and start sending an acknowledgement frame to the first station or the third station; and after the interrupt duration elapses, resume sending the downlink data frame.

For example, the communications apparatus further includes a measurement unit 1404, configured to:

perform channel self-interference measurement when the transmission unit 1403 sends the trigger frame.

For example, the information about the first station, the information about the second station, or the information about the third station is specifically:

an identifier of a single station, an address of a single station, a group identifier, or a group address.

For example, when a total quantity of the first station and the third station is greater than 2, the scheduling information further includes information about resource allocation in uplink multi-user multiple input multiple output MU-MIMO or information about resource allocation in uplink orthogonal frequency division multiple access OFDMA; or when a total quantity of the second station and the third station is greater than 2, the scheduling information further includes information about resource allocation in downlink multi-user multiple input multiple output MU-MIMO or information about resource allocation in downlink orthogonal frequency division multiple access OFDMA.

Based on an invention concept same as that of the foregoing method, an embodiment of the present invention further provides a communications apparatus.

Figure 15:
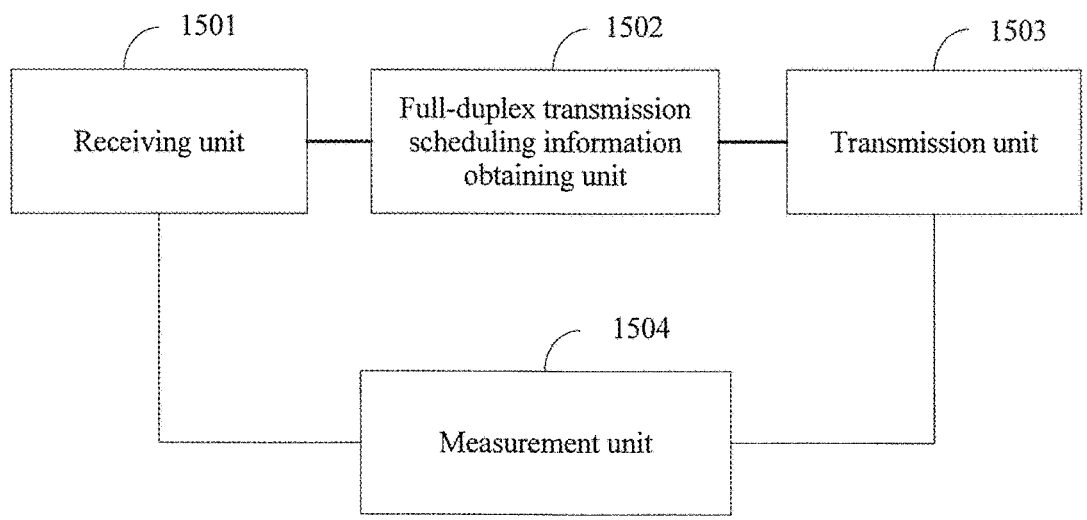
FIG. 15 is a structural diagram of another communications apparatus according to an embodiment of the present invention.

As shown in FIG. 15, an embodiment of the present invention provides a communications apparatus. The apparatus is disposed on a station STA in a wireless local area network and includes:

a receiving unit 1501, configured to receive scheduling information sent by an access point AP;

a scheduling information obtaining unit 1502, configured to obtain the scheduling information by means of parsing, where the scheduling information includes information about a first station that performs uplink transmission on the channel and information about a second station that performs downlink transmission on the channel at the same time, or the scheduling information includes information about a third station that simultaneously performs uplink and downlink transmission on the channel; and a transmission unit 1503, configured to transmit data according to the scheduling information when the station STA on which the communications apparatus is located is the first station, the second station, or the third station.

For example, the transmission unit 1503 is specifically configured to:

after receiving of a trigger frame that carries the scheduling information is completed, if the STA on which the communications apparatus is located is the first station, send an uplink data frame after waiting for SIFS, where a legacy preamble in the uplink data frame and a legacy preamble in a downlink data frame sent by the AP to the second station are simultaneously sent and have same content; or after receiving of a trigger frame that carries the scheduling information is completed, if the STA on which the communications apparatus is located is the third station, send an uplink data frame immediately, where a legacy preamble in the uplink data frame is the same as a legacy preamble in a downlink data frame sent by the AP to the third station.

For example, the legacy preamble includes a rate field and a length field, and a value of the rate field and a value of the length field meet: receive duration RXTIME that is calculated according to the value of the rate field and the value of the length field is not less than duration of full-duplex transmission including an acknowledgement frame.

For example, the scheduling information further includes transmission duration or an upper limit of transmission duration of the uplink data frame sent by the first station or the third station, or transmission duration or an upper limit of transmission duration of the downlink data frame sent to the second station or the third station.

For example, if the transmission duration of the uplink data frame sent by the first station or the third station is greater than the transmission duration of the downlink data frame sent by the AP, and an absolute value of a difference between the two is greater than the SIFS, the scheduling information further includes:

an interrupt location and interrupt duration in an uplink data frame transmission process of the first station or the third station.

The transmission unit 1503 is further configured to:

when the STA on which the communications apparatus is located is the first station or the third station, stop sending the uplink data frame at the interrupt location in the uplink data frame transmission process, and after the interrupt duration elapses, resume sending the uplink data frame.

For example, if the transmission duration of the downlink data frame sent by the AP is greater than the transmission duration of the uplink data frame sent by the first station or the third station, and an absolute value of a difference between the two is greater than the SIFS, the scheduling information further includes:

an interrupt location and interrupt duration in a downlink data frame transmission process of the AP.

The transmission unit 1503 is further configured to:

when the STA on which the communications apparatus is located is the second station or the third station, stop, at the interrupt location in transmitting the downlink data frame sent by the AP, receiving the downlink data frame sent by the AP, and after the interrupt duration elapses, resume receiving the downlink data frame sent by the AP.

For example, the communications apparatus further includes a measurement unit 1504, configured to:

after receiving of the trigger frame is completed, perform channel self-interference measurement in transmission duration of the legacy preamble.

Based on an invention concept same as that of the foregoing method, an embodiment of the present invention further provides a network-side device.

Figure 16:
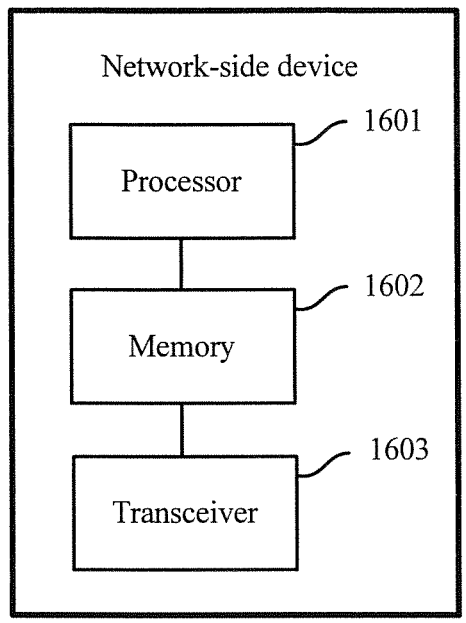
FIG. 16 is a schematic structural diagram of a network-side device according to an embodiment of the present invention.

As shown in FIG. 16, an embodiment of the present invention provides a network-side device, including a transceiver 1603, a processor 1601, and a memory 1602.

The memory 1602 is configured to store one or more executable programs, which are used to configure the processor.

The processor 1601 is configured to: obtain use permission of a channel; and after obtaining the use permission of the channel, determine scheduling information for a station participating in full-duplex transmission. The scheduling information includes information about a first station that performs uplink transmission on the channel and information about a second station that performs downlink transmission on the channel at the same time, or the scheduling information includes information about a third station that simultaneously performs uplink and downlink transmission on the channel.

The transceiver 1603 is configured to send the scheduling information.

For example, the transceiver 1603 is further configured to:

after sending of a trigger frame that carries the scheduling information is completed, send a downlink data frame to the second station or the third station after waiting for SIFS, where the downlink data frame includes a legacy preamble, and the legacy preamble in the downlink data frame sent to the second station and a legacy preamble in an uplink data frame sent by the first station are simultaneously sent on the channel and have same content; or the legacy preamble in the downlink data frame sent to the third station and a legacy preamble in an uplink data frame sent by the third station are simultaneously sent on the channel and have same content.

For example, the legacy preamble includes a rate field and a length field, and a value of the rate field and a value of the length field meet: receive duration RXTIME that is calculated according to the value of the rate field and the value of the length field is not less than duration of full-duplex transmission including an acknowledgement frame.

For example, the scheduling information further includes transmission duration or an upper limit of transmission duration of the uplink data frame sent by the first station or the third station, or transmission duration or an upper limit of transmission duration of the downlink data frame sent to the second station or the third station.

For example, if the transmission duration of the uplink data frame sent by the first station or the third station is greater than the transmission duration of the downlink data frame sent by the access point AP, and an absolute value of a difference between the two is greater than the short interframe space SIFS, the scheduling information further includes an interrupt location and interrupt duration in an uplink data frame transmission process of the first station or the third station.

The transceiver 1603 is further configured to:

stop, at the interrupt location in the uplink data frame transmission process of the first station or the third station, receiving the uplink data frame sent by the first station or the third station, and start receiving an acknowledgement frame sent by the second station or the third station; and after the interrupt duration elapses, resume receiving the uplink data frame sent by the first station or the third station.

For example, if the transmission duration of the downlink data frame sent by the AP to the second station or the third station is greater than the transmission duration of the uplink data frame sent by the first station or the third station, and an absolute value of a difference between the two is greater than the SIFS, the scheduling information further includes:

an interrupt location and interrupt duration in a downlink data frame transmission process of the AP.

The transceiver 1603 is further configured to:

stop, at the interrupt location in transmitting the downlink data frame of the AP, transmitting the downlink data frame, and start sending an acknowledgement frame to the first station or the third station; and after the interrupt duration elapses, resume sending the downlink data frame.

For example, the processor 1601 is configured to:

perform channel self-interference measurement when the trigger frame is being sent.

For example, the information about the first station, the information about the second station, or the information about the third station is specifically:

an identifier of a single station, an address of a single station, a group identifier, or a group address.

For example, when a total quantity of the first station and the third station is greater than 2, the scheduling information further includes information about resource allocation in uplink multi-user multiple input multiple output MU-MIMO or information about resource allocation in uplink orthogonal frequency division multiple access OFDMA; or when a total quantity of the second station and the third station is greater than 2, the scheduling information further includes information about resource allocation in downlink multi-user multiple input multiple output MU-MIMO or information about resource allocation in downlink orthogonal frequency division multiple access OFDMA.

Based on an invention concept same as that of the foregoing method, an embodiment of the present invention further provides user equipment.

Figure 17:
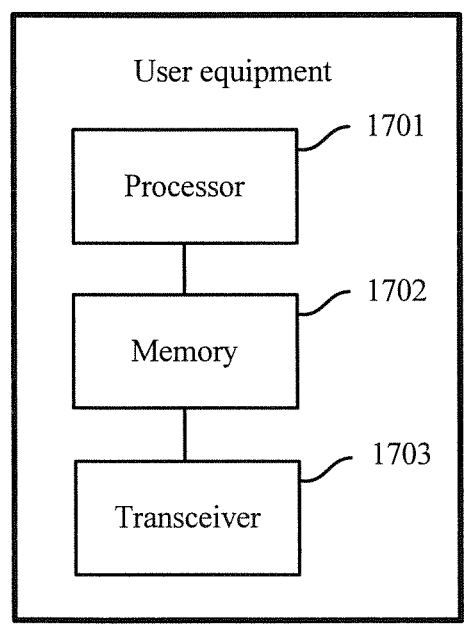
FIG. 17 is a schematic structural diagram of user equipment according to an embodiment of the present invention.

As shown in FIG. 17, an embodiment of the present invention provides user equipment, including a transceiver 1703, a processor 1701, and a memory 1702.

The memory 1702 is configured to store one or more executable programs, which are used to configure the processor.

The transceiver 1703 is configured to receive scheduling information sent by an access point AP.

The processor 1701 is configured to obtain the scheduling information by means of parsing. The scheduling information includes information about a first station that performs uplink transmission on the channel and information about a second station that performs downlink transmission on the channel at the same time, or the scheduling information includes information about a third station that simultaneously performs uplink and downlink transmission on the channel.

The transceiver 1703 is configured to transmit data according to the scheduling information when a station STA on which the communications apparatus is located is the first station, the second station, or the third station.

For example, the transceiver 1703 is specifically configured to:

after receiving of a trigger frame that carries the scheduling information is completed, if the STA on which the communications apparatus is located is the first station, send an uplink data frame after waiting for SIFS, where a legacy preamble in the uplink data frame and a legacy preamble in a downlink data frame sent by the AP to the second station are simultaneously sent and have same content; or after receiving of a trigger frame that carries the scheduling information is completed, if the STA on which the communications apparatus is located is the third station, send an uplink data frame immediately, where a legacy preamble in the uplink data frame is the same as a legacy preamble in a downlink data frame sent by the AP to the third station.

For example, the legacy preamble includes a rate field and a length field, and a value of the rate field and a value of the length field meet: receive duration RXTIME that is calculated according to the value of the rate field and the value of the length field is not less than duration of full-duplex transmission including an acknowledgement frame.

For example, the scheduling information further includes transmission duration or an upper limit of transmission duration of the uplink data frame sent by the first station or the third station, or transmission duration or an upper limit of transmission duration of the downlink data frame sent to the second station or the third station.

For example, if the transmission duration of the uplink data frame sent by the first station or the third station is greater than the transmission duration of the downlink data frame sent by the AP, and an absolute value of a difference between the two is greater than the SIFS, the scheduling information further includes:

an interrupt location and interrupt duration in an uplink data frame transmission process of the first station or the third station.

The transceiver 1703 is further configured to:

when the STA on which the communications apparatus is located is the first station or the third station, stop sending the uplink data frame at the interrupt location in the uplink data frame transmission process, and after the interrupt duration elapses, resume sending the uplink data frame.

For example, if the transmission duration of the downlink data frame sent by the AP is greater than the transmission duration of the uplink data frame sent by the first station or the third station, and an absolute value of a difference between the two is greater than the SIFS, the scheduling information further includes:

an interrupt location and interrupt duration in a downlink data frame transmission process of the AP.

The transceiver 1703 is further configured to:

when the STA on which the communications apparatus is located is the second station or the third station, stop, at the interrupt location in transmitting the downlink data frame sent by the AP, receiving the downlink data frame sent by the AP, and after the interrupt duration elapses, resume receiving the downlink data frame sent by the AP.

For example, the processor 1701 is further configured to:

after receiving of the trigger frame is completed, perform channel self-interference measurement in transmission duration of the legacy preamble.

According to the method provided in the embodiments of the present invention, scheduling information is determined after an AP obtains use permission of a channel by means of contention, and a STA participating in full-duplex transmission is scheduled. The scheduling information includes a transmission direction of the STA. Therefore, full-duplex communication between the AP and the STA can be implemented in a WLAN system.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A communications apparatus disposed on an access point (AP) apparatus in a wireless local area network, the communications apparatus comprising:
   a channel contention unit, configured to obtain use permission of a channel;
   a scheduling information determining unit, configured to:
      after the use permission of the channel is obtained, determine scheduling information for a station participating in full-duplex transmission, wherein the scheduling information comprises information about a first station that performs uplink transmission on the channel and information about a second station that performs downlink transmission on the channel at the same time, or the scheduling information comprises information about a third station that simultaneously performs uplink and downlink transmission on the channel; and
   a transmission unit, configured to:
      send the scheduling information,
      after sending of a trigger frame that carries the scheduling information is completed, send a downlink data frame comprising a legacy preamble to the second station or the third station after waiting for a short interframe space (SIFS), wherein the legacy preamble in the downlink data frame sent to the second station and a legacy preamble in an uplink data frame sent by the first station are simultaneously sent on the channel and have the same content or the legacy preamble in the downlink data frame sent to the third station and a legacy preamble in an uplink data frame sent by the third station are simultaneously sent on the channel and have the same content.

2. The communications apparatus according to claim 1, wherein:
   the legacy preamble comprises a rate field and a length field, and a value of the rate field and a value of the length field meet; and a receive duration (RXTIME) that is calculated according to the value of the rate field and the value of the length field is not less than a duration of full-duplex transmission comprising an acknowledgement frame.

3. The communications apparatus according to claim 1, wherein the scheduling information further comprises:
  transmission duration or an upper limit of transmission duration of the uplink data frame sent by the first station or the third station, or transmission duration or an upper limit of transmission duration of the downlink data frame sent to the second station or the third station.

4. A communications apparatus disposed on a station (STA) in a wireless local area network, the apparatus comprising:
  a receiving unit, configured to receive scheduling information sent by an access point (AP);
  a scheduling information obtaining unit, configured to obtain the scheduling information by means of parsing, wherein the scheduling information comprises information about a first station that performs uplink transmission on a channel and information about a second station that performs downlink transmission on the channel at the same time, or the scheduling information comprises information about a third station that simultaneously performs uplink and downlink transmission on the channel; and
  a transmission unit, configured to:
    transmit data according to the scheduling information when the station (STA) on which the communications apparatus is located is the first station, the second station, or the third station, and
    after receiving of a trigger frame that carries the scheduling information is completed,
      when the STA on which the communications apparatus is located is the first station, send an uplink data frame after waiting for a short interframe space (SIFS), wherein a legacy preamble in the uplink data frame and a legacy preamble in a downlink data frame sent by the AP to the second station are simultaneously sent and have the same content, or
      when the STA on which the communications apparatus is located is the third station, send an uplink data frame immediately, wherein a legacy preamble in the uplink data frame is the same as a legacy preamble in a downlink data frame sent by the AP to the third station.

5. The apparatus according to claim 4, wherein:
  the legacy preamble comprises a rate field and a length field, and a value of the rate field and a value of the length field meet; and
  a receive duration (RXTIME) that is calculated according to the value of the rate field and the value of the length field is not less than a duration of full-duplex transmission comprising an acknowledgement frame.

6. The apparatus according to claim 4, wherein the scheduling information further comprises transmission duration or an upper limit of transmission duration of the uplink data frame sent by the first station or the third station, or transmission duration or an upper limit of transmission duration of the downlink data frame sent to the second station or the third station.

7. A full-duplex communication method for use in a WLAN system, wherein the method is applied to an access point (AP) in a wireless local area network, the method comprising:

obtaining, by the access point (AP), use permission of a channel;
determining, by the AP after obtaining the use permission of the channel, scheduling information for a station (STA) participating in full-duplex transmission, wherein the scheduling information comprises information about a first station that performs uplink transmission on the channel and information about a second station that performs downlink transmission on the channel at the same time, or the scheduling information comprises information about a third station that simultaneously performs uplink and downlink transmission on the channel; and
sending, by the AP, the scheduling information in a trigger frame;
after sending of the trigger frame is completed, sending, by the AP, a downlink data frame comprising a legacy preamble to the second station or the third station after waiting for a short interframe space (SIFS); and
wherein the legacy preamble in the downlink data frame sent to the second station and a legacy preamble in an uplink data frame sent by the first station are simultaneously sent on the channel and have same content, or the legacy preamble in the downlink data frame sent to the third station and a legacy preamble in an uplink data frame sent by the third station are simultaneously sent on the channel and have same content.

8. The method according to claim 7, wherein:
the legacy preamble comprises a rate field and a length field, and a value of the rate field and a value of the length field meet; and
a receive duration (RXTIME) that is calculated according to the value of the rate field and the value of the length field is not less than a duration of full-duplex transmission comprising an acknowledgement frame.

9. The method according to claim 7, wherein the scheduling information further comprises transmission duration or an upper limit of transmission duration of the uplink data frame sent by the first station or the third station, or transmission duration or an upper limit of transmission duration of the downlink data frame sent to the second station or the third station.

10. A full-duplex communication method for use in a wireless local area network (WLAN) system, wherein the method is applied to a station (STA) in a wireless local area network, the method comprising:
  receiving scheduling information sent by an access point (AP);
  obtaining the scheduling information by means of parsing, wherein the scheduling information comprises information about a first station that performs uplink transmission on the channel and information about a second station that performs downlink transmission on the channel at the same time, or the scheduling information comprises information about a third station that simultaneously performs uplink and downlink transmission on the channel; and
  transmitting, by the first station, the second station, or the third station, data according to the scheduling information, comprising:
    after receiving of a trigger frame that carries the scheduling information is completed,
      sending, by the first station, an uplink data frame after waiting for a short interframe space (SIFS), wherein a legacy preamble in the uplink data frame and a legacy preamble in a downlink data frame sent by the AP to the second station are simultaneously sent and have same content, or sending, by the third station, an uplink data frame immediately, wherein a legacy preamble in the uplink data frame is the same as a legacy preamble in a downlink data frame sent by the AP to the third station.

11. The method according to claim 10, wherein:

the legacy preamble comprises a rate field and a length field, and a value of the rate field and a value of the length field meet; and a receive duration (RXTIME) that is calculated according to the value of the rate field and the value of the length field is not less than a duration of full-duplex transmission comprising an acknowledgement frame.

* * * * *